US008619867B2

(12) United States Patent
Craig et al.

(10) Patent No.: US 8,619,867 B2
(45) Date of Patent: *Dec. 31, 2013

(54) VIDEO GAME SYSTEM USING PRE-ENCODED MACRO-BLOCKS AND A REFERENCE GRID

(75) Inventors: Robert Craig, Sunnyvale, CA (US); Clifford Wayne Mercer, Palo Alto, CA (US); Ulrich Sigmund, Waldkirch (DE)

(73) Assignee: Activevideo Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/609,183

(22) Filed: Sep. 10, 2012

(65) Prior Publication Data

US 2013/0003826 A1    Jan. 3, 2013

Related U.S. Application Data

(63) Continuation of application No. 11/178,183, filed on Jul. 8, 2005, now Pat. No. 8,284,842.

(51) Int. Cl.
*H04N 7/12* (2006.01)
*H04N 11/02* (2006.01)
*H04N 11/04* (2006.01)
*H04N 7/173* (2011.01)
*G06K 9/36* (2006.01)
*A63F 9/24* (2006.01)

(52) U.S. Cl.
USPC .......... 375/240.24; 375/240.12; 725/95; 725/105; 725/109; 463/31; 382/232

(58) Field of Classification Search
USPC .................................... 375/240.24
See application file for complete search history.

(56) References Cited

U.S. PATENT DOCUMENTS

| RE35,314 E | 8/1996 | Logg |
| 5,596,693 A | 1/1997 | Needle et al. |
| 5,630,757 A | 5/1997 | Gagin et al. |
| 5,995,146 A | 11/1999 | Rasmussen |
| 6,014,416 A | 1/2000 | Shin et al. |
| 6,078,328 A | 6/2000 | Schumann et al. |
| 6,084,908 A | 7/2000 | Chiang et al. |

(Continued)

FOREIGN PATENT DOCUMENTS

| CA | 2163500 | 5/1996 |
| EP | 0714684 A1 | 6/1996 |

(Continued)

OTHER PUBLICATIONS

Tag, Networks Inc., Office Action, JP 2008-506474, Oct. 1, 2012, 5 pgs.

(Continued)

*Primary Examiner* — Chikaodili E Anyikire
*Assistant Examiner* — Hee-Yong Kim
(74) *Attorney, Agent, or Firm* — Morgan, Lewis & Bockius LLP

(57) ABSTRACT

A method and related system of generating a frame of video is disclosed. In the method, a request is received and a frame of video is generated using a plurality of pre-encoded macro-blocks. Generating the frame of video includes assigning the plurality of pre-encoded macro-blocks to respective positions in a grid. The frame of video may be compatible with an MPEG compression standard. The plurality of pre-encoded macro-blocks are pre-encoded prior to the request.

24 Claims, 14 Drawing Sheets

(56) References Cited

U.S. PATENT DOCUMENTS

| | | | |
|---|---|---|---|
| 6,192,081 | B1 | 2/2001 | Chiang et al. |
| 6,205,582 | B1 | 3/2001 | Hoarty |
| 6,226,041 | B1 | 5/2001 | Florencio et al. |
| 6,243,418 | B1 | 6/2001 | Kim |
| 6,253,238 | B1 | 6/2001 | Lauder et al. |
| 6,256,047 | B1 | 7/2001 | Isobe et al. |
| 6,292,194 | B1 | 9/2001 | Powell, II |
| 6,305,020 | B1 | 10/2001 | Hoarty et al. |
| 6,317,151 | B1 | 11/2001 | Ohsuga et al. |
| 6,386,980 | B1 | 5/2002 | Nishino et al. |
| 6,481,012 | B1 | 11/2002 | Gordon et al. |
| 6,557,041 | B2 | 4/2003 | Mallart |
| 6,579,184 | B1 | 6/2003 | Tanskanen |
| 6,614,442 | B1 | 9/2003 | Ouyang et al. |
| 6,645,076 | B1 | 11/2003 | Sugai |
| 6,675,387 | B1 | 1/2004 | Boucher et al. |
| 6,754,271 | B1 | 6/2004 | Gordon et al. |
| 6,758,540 | B1 | 7/2004 | Adolph et al. |
| 6,810,528 | B1 | 10/2004 | Chatani |
| 6,817,947 | B2 | 11/2004 | Tanskanen |
| 2001/0049301 | A1 | 12/2001 | Masuda et al. |
| 2002/0021353 | A1 | 2/2002 | DeNies |
| 2002/0072408 | A1 | 6/2002 | Kumagai |
| 2002/0191851 | A1 | 12/2002 | Keinan |
| 2003/0027517 | A1 | 2/2003 | Callway et al. |
| 2003/0058941 | A1 | 3/2003 | Chen et al. |
| 2003/0122836 | A1 | 7/2003 | Doyle et al. |
| 2003/0189980 | A1 | 10/2003 | Dvir et al. |
| 2003/0229719 | A1 | 12/2003 | Iwata et al. |
| 2004/0139158 | A1 | 7/2004 | Datta |
| 2004/0157662 | A1 | 8/2004 | Tsuchiya |
| 2004/0184542 | A1 | 9/2004 | Fujimoto |
| 2004/0261114 | A1 | 12/2004 | Addington et al. |
| 2005/0044575 | A1 | 2/2005 | Der Kuyl |
| 2005/0089091 | A1 | 4/2005 | Kim et al. |

FOREIGN PATENT DOCUMENTS

| | | | |
|---|---|---|---|
| EP | 1428562 | A2 | 6/2004 |
| GB | 2378345 | A | 2/2003 |
| JP | 10-510131 | | 9/1998 |
| JP | 2001-245271 | A | 9/2001 |
| JP | 2002-208027 | | 7/2002 |
| JP | 2004-110850 | | 4/2004 |
| JP | 2004-536681 | | 12/2004 |
| JP | 2005-519382 | A | 6/2005 |
| WO | WO 99/00735 | A1 | 1/1999 |
| WO | WO 99/65232 | A1 | 12/1999 |
| WO | WO 00/41397 | A1 | 7/2000 |
| WO | WO 01/41447 | A1 | 6/2001 |
| WO | WO 03/047710 | A2 | 6/2003 |
| WO | WO 2004/018060 | A2 | 3/2004 |
| WO | WO 2006/110268 | A1 | 10/2006 |

OTHER PUBLICATIONS

Craig, Notice of Allowance, U.S. Appl. No. 11/178,183, Jan. 12, 2012, 7 pgs.
Craig, Notice of Allowance, U.S. Appl. No. 11/178,183, Jul. 19, 2012, 8 pgs.
Craig, Office Action, U.S. Appl. No. 11/178,183, Dec. 6, 2010, 12 pgs.
Craig, Office Action, U.S. Appl. No. 11/178,183, Apr. 13, 2011, 16 pgs.
Craig, Office Action, U.S. Appl. No. 11/178,183, Sep. 15, 2011, 12 pgs.
Craig, Office Action, U.S. Appl. No. 11/178,183, Feb. 19, 2010, 17 pgs.
Craig, Office Action, U.S. Appl. No. 11/178,183, Jul. 20, 2010, 13 pgs.
Craig, Notice of Allowance, U.S. Appl. No. 11/178,189, Oct. 12, 2011, 7 pgs.
Tag Networks, Inc., Office Action, Japanese Patent Application 2008-520254, Oct. 20, 2011, 2 pgs.
JP Office Action for Related Application No. 2008-506474, Mailing Date Aug. 8, 2011, 5 pages.
Craig, Office Action for U.S. Appl. No. 11/178,177, Notification Date Aug. 3, 2011, 26 pages.
Craig, Office Action for U.S. Appl. No. 11/178,177, Notification Date Mar. 29, 2011, 15 pages.
Craig, Office Action for U.S. Appl. No. 11/178,181, Notification Date Jun. 20, 2011, 24 pages.
Craig, Office Action for U.S. Appl. No. 11/178,189, Notification Date May 26, 2011, 18 pages.
Craig, Office Action, U.S. Appl. No. 11/178,189, Nov. 9, 2010, 13 pgs.
Annex C—Video buffering verifier, Information Technology—Generic coding of moving pictures and associated audio information: Video, ITU-T Recommendation H.262, Feb. 2000, 6 pgs.
Isovic, Timing constraints of MPEG-2 decoding for high quality video: misconceptions and realistic assumptions, 15th Euromicro Conference, Piscataway, NJ, Jul. 2-4, 2003, 10 pgs.
MPEG-2 Video Elementary Stream Supplemental Information, International Organisation for Standardisation: Coding of Moving Pictures and Audio, Dec. 1999, 12 pgs.
Talley, A General Framework for Continuous Media Transmission Control, 15th IEEE Conference, Minneapolis, MN, Oct. 13-16, 1996, pp. 374-383.
Craig, Office Action, Chinese Patent Application, 200680017662.3, Apr. 26, 2010, 4 pgs.
Tag Networks, Inc., Communication under Rule 71(3) EPC, European Patent Application 06773714.8, Jan. 12, 2010, 4 pgs.
Tag Networks, Inc., Communication pursuant to Article 94(3) EPC, European Patent Application, 06739032.8, Aug. 14, 2009, 4 pgs.
Tag Networks, Inc., Communication pursuant to Article 94(3) EPC, European Patent Application, 06773714.8, May 6, 2009, 3 pgs.
Tag Networks, Inc., International Preliminary Report on Patentability, PCT/US2006/010080, Oct. 16, 2007, 6 pgs.
Tag Networks, Inc., International Preliminary Report on Patentability, PCT/US2006/024194, Jan. 10, 2008, 7 pgs.
Tag Networks, Inc., International Preliminary Report on Patentability, PCT/US2006/024195, Apr. 1, 2009, 11 pgs.
Tag Networks, Inc., International Preliminary Report on Patentability, PCT/US2006/024196, Jan. 10, 2008, 6 pgs.
Tag Networks, Inc., International Search Report and Written Opinion, PCT/US2006/024194, Dec. 15, 2006, 10 pgs.
Tag Networks, Inc., International Search Report and Written Opinion, PCT/US2006/024197, Nov. 28, 2006, 9 pgs.
Craig, Notice of Allowance, U.S. Appl. No. 11/178,176, Dec. 23, 2010, 8 pgs.
Craig, Final Office Action, U.S. Appl. No. 11/103,838, Jul. 6, 2010, 35 pgs.
Craig, Final Office Action, U.S. Appl. No. 11/178,176, Oct. 1, 2010, 8 pgs.
Craig, Office Action, U.S. Appl. No. 11/178,176, May 6, 2010, 7 pgs.
Craig, Final Office Action, U.S. Appl. No. 11/178,177, Oct. 26, 2010, 12 pgs.
Craig, Office Action, U.S. Appl. No. 11/178,181, Feb. 11, 2011, 19 pgs.
Craig, Final Office Action, U.S. Appl. No. 11/178,181, Aug. 25, 2010, 17 pgs.
Craig, Office Action, U.S. Appl. No. 11/178,181, Mar. 29, 2010, 10 pgs.
Craig, Office Action, U.S. Appl. No. 11/178,182, Feb. 23, 2010, 15 pgs.
Craig, Final Office Action, U.S. Appl. No. 11/178,189, Mar. 15, 2010, 11 pgs.
Tag Networks, Inc., International Search Report for PCT/US2006/010080 mailed Jun. 20, 2006, 3 pages.
Tag Networks, Inc., International Search Report for PCT/US2006/024195 mailed Nov. 29, 2006, 4 pages.
Tag Networks, Inc., International Search Report for PCT/US2003/024196 mailed Dec. 11, 2006, 11 pages.
Tag Networks, Inc., International Search Report for PCT/US2008/050221 mailed Jun. 12, 2008, 11 pages.
Craig, Office Action for U.S. Appl. No. 11/103,838, dated Aug. 19, 2008, 17 pages.

(56) References Cited

OTHER PUBLICATIONS

Craig, Office Action for U.S. Appl. No. 11/103,838, dated Feb. 5, 2009, 30 pages.

Craig, Office Action for U.S. Appl. No. 11/103,838, dated May 12, 2009, 32 pages.

Craig, Office Action for U.S. Appl. No. 11/103,838, dated Nov. 19, 2009, 33 pages.

Craig, Office Action for U.S. Appl. No. 11/178,189, dated Jul. 23, 2009, 13 pages.

Craig, Office Action for U.S. Appl. No.11/178,177, dated Mar. 29, 2010, 15 pages.

Tudor, "MPEG-2 Video Compression," Electronics & Communication Engineering Journal, Dec. 1995, 15 pgs.

VIDEO GAME SYSTEM USING PRE-ENCODED MACRO-BLOCKS AND A REFERENCE GRID

RELATED APPLICATIONS

This application is a continuation of U.S. patent application Ser. No. 11/178,183, entitled "Video Game System Using Pre-Encoded Macro-Blocks and a Reference Grid," filed Jul. 8, 2005, now U.S. Pat. No. 8,284,842 which is incorporated by reference herein in its entirety.

FIELD OF THE INVENTION

The present invention relates generally to an interactive video-game system, and more specifically to an interactive video-game system using pre-encoded macro-blocks.

BACKGROUND

Video games are a popular form of entertainment. Multi-player games, where two or more individuals play simultaneously in a common simulated environment, are becoming increasingly common, especially as more users are able to interact with one another using networks such as the World Wide Web (WWW), which is also referred to as the Internet. Implementing video games in a networked environment poses several challenges.

In particular, video games, especially those offering high-quality graphics, may produce data streams having a maximum data rate that is a significant fraction of an available data rate communications capacity in a network. The data rate may also vary significantly as a function of time depending on how often a game state for a respective game is modified or updated. This combination of high data rates and time-varying data rates may make cost effective and efficient resource allocation in a networked environment, such as a satellite system, a cable television system or the Internet, challenging. Video-game systems in such network environments may need additional margin, in the form of additional bandwidth overhead as well as hardware and software redundancy, to ensure that performance is not degraded. These systems challenges are compound for multi-player games.

Encoding of the data streams in a video-game system using an existing encoding approach, such as one of the compression standards developed by the Moving Pictures Expert Group (MPEG), may only offer, at best, a partial solution to these problems and may also pose additional challenges. For example, MPEG2 is a flexible compression standard that takes advantage of the fact that much of the content in digital video (up to 95%) may be redundant information. Encoding of these portions of the content may significantly reduce the corresponding data rate. Other portions of the content, however, may be much less redundant. In conventional MPEG2 encoding, this may result in higher data rates for more complex images. As a consequence, MPEG2 encoded data streams may still have a data rate that varies significantly as a function of time. In addition, real-time or on-the-fly encoding of multiple data streams using an existing encoding approach, such as MPEG2, may increase the complexity, cost and/or power consumption of the video-game system.

There is a need, therefore, for an improved system for implementing video games in networked environments.

SUMMARY

A method and related system of generating a frame of video is disclosed. In the method, a request is received and a frame of video is generated using a plurality of pre-encoded macro-blocks. Generating the frame of video includes assigning the plurality of pre-encoded macro-blocks to respective positions in a grid. The frame of video may be compatible with an MPEG compression standard. The plurality of pre-encoded macro-blocks are pre-encoded prior to the request.

The grid may be a 2-dimensional array. Each element of the grid may reference respective macro-blocks, at least a plurality of which may be pre-encoded.

The request may initiate a video game. The generating may include comparing a previous state of the grid with a current state of the grid and selectively including in a data stream corresponding to the frame of video intra macro-blocks and predictive macro-blocks in accordance with the comparing. A respective state of the grid may be in accordance with a game state in a video game.

A respective pre-encoded macro-block may include meta data, which may include a quantization factor. A subset of the plurality of pre-encoded macro-blocks may include un-compressed pixel information.

In some embodiments, one or more skipped predictive macro-blocks corresponding to regions of the frame of video that are substantially unchanged with respect to a previous frame of video may be selectively included in a data stream corresponding to the frame of video.

In some embodiments, one or more empty predictive macro-blocks corresponding to regions of the frame of video that are substantially unchanged with respect to a previous frame of video may be selectively included in a data stream corresponding to the frame of video.

In some embodiments, generating a frame of video includes dynamically generating a plurality of macro-blocks. The dynamically generated plurality of macro-blocks may include a combination of pre-encoded macro-blocks that include un-compressed pixel information and image information corresponding to an object. The combination may include blending at least a portion of the un-compressed pixel information of the pre-encoded macro-blocks and the image information corresponding to the object. The combination may include superposition of the image information corresponding to the object on a region of the frame of video.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
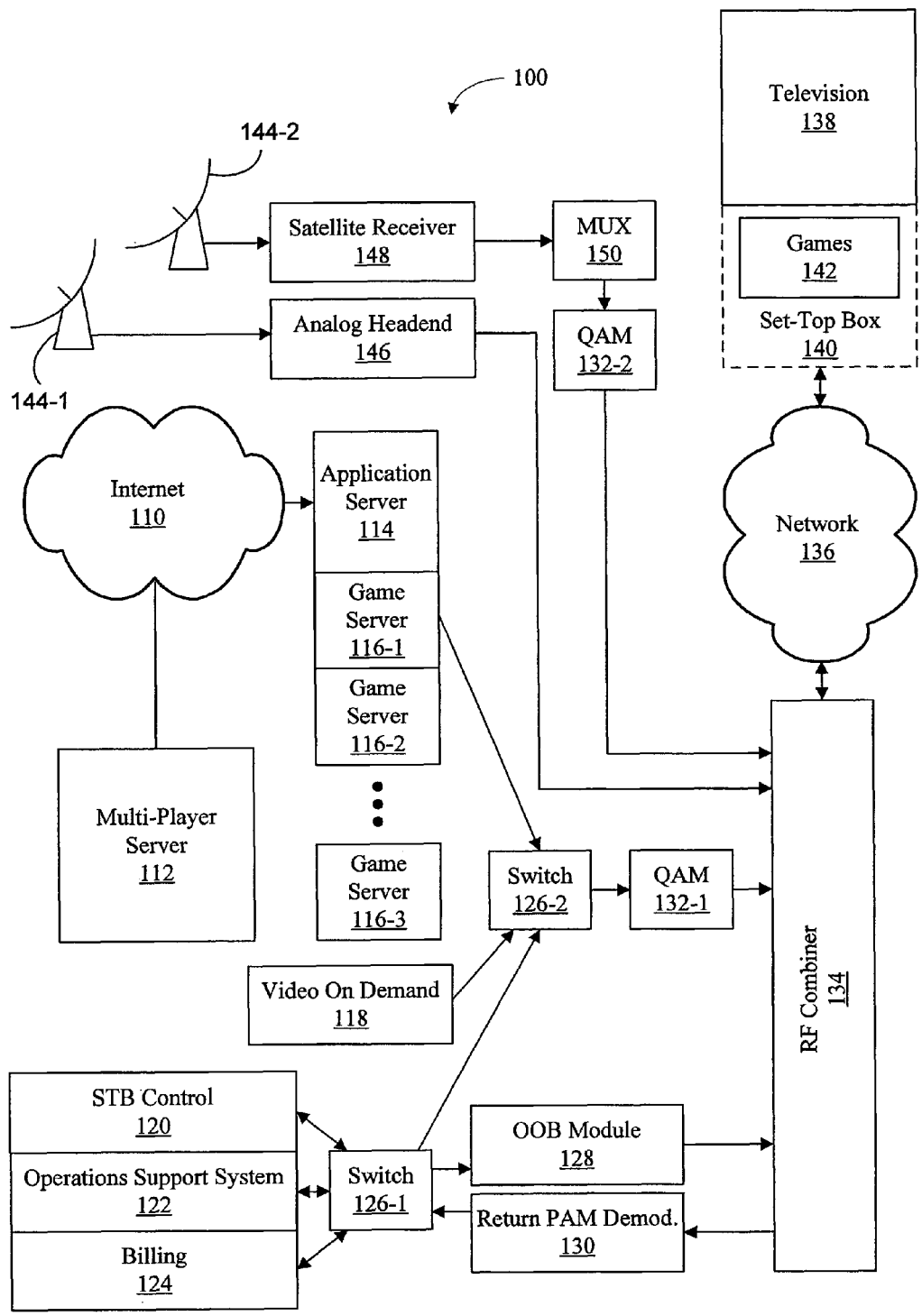
FIG. 1 is a block diagram illustrating an embodiment of a cable television system.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

An improved method, and related system, for offering interactive video games using networks, such as those in satellite systems, cable television systems (CATV), the Internet, wide area networks, local area networks and/or telephone systems, is described. As described below, the method and system utilizes efficient digitizing of video-game content corresponding to frames and/or fields of video-game images (henceforth referred to as frames of video) to reduce a communication bandwidth and thereby increase a number of users or players (henceforth referred to as users) that may be supported. The term video game includes video games, other forms of computer-implemented recreational application programs, and non-recreational application programs, such as news, weather and/or sports. Players or users refer to one or more humans that participate in one or more video games.

In particular, frames of video images or updates to one or more frames of video corresponding to one or more video games (including single and/or multi-player video games) are generated using a plurality pre-encoded tiles or macro-blocks, which are encoded prior to a request to initiate the one or more video games. A macro-block includes a set of pixels, for example, a 16-by-16 array of pixels. Generating the frames of video may include interrelating dc coefficients in adjacent macro-blocks, selecting a pre-determined motion vector and compensation data for adjacent macro-blocks, calculating a motion vector and compensation data for adjacent macro-blocks, and/or quantization factors for adjacent macro-blocks. The use of pre-encoded macro-blocks takes advantage of the fact that some or all of the content in a video game may remain unchanged in multiple, successive frames of video (for example, user actions may leave some or all of the content unchanged). As a consequence, some or all of the content may be pre-encoded. This may reduce the complexity and/or cost associated with implementing the video-game system in a networked environment, for example, by simplifying the infrastructure and/or reducing the computational resources needed to generate the frames of video images. In addition, encoding (compressing) the content may also reduce a data rate in a data stream corresponding to the frames of video.

The plurality of pre-encoded macro-blocks may be generated and stored in a bank of individually addressable pre-encoded macro-blocks. This may allow a subset of the plurality of pre-encoded macro-blocks to be shared, for example, in two or more video games, in two or more frames of video and/or in two or more instances of a video game. This sharing may also reduce the cost and/or complexity of implementing the video-game system in a networked environment. It may also allow the video-game system to support multi-player video games with less infrastructure.

In some embodiments, a respective frame of video is generated using a subset of the plurality of pre-encoded macro-blocks and a reference grid. The reference grid includes indices and/or pointers to macro-blocks, with each box or entry in the reference grid corresponding to a location in the respective frame of video. Comparing a previous frame of video with the respective frame of video allows the respective frame of video to be generated by positioning appropriate pre-encoded macro-blocks at appropriate indices and/or pointers corresponding to the reference grid. The comparison may include the tile indices at the corresponding and/or a adjacent positions of the previous frames tile grid. The comparison, therefore, involves indices for macro-blocks as opposed to the full set of pixels in the frame of video. This may result in a significant reduction in an amount of computation.

In some embodiments, a plurality of macro-blocks may also be generated during one or more video games. After a request for a video game is received, some of these macro-blocks may be generated once, and then used in multiple video frames. This may include, for example, macro-blocks for information that is not available until the video game is requested, such as those corresponding to text (a user name) or simple animation. As will be explained in more detail below, motion vectors and/or compensation data corresponding to the animation may also be pre-encoded. Other macro-blocks may be dynamically generated in response to one or more user commands during the video game. The one or more user commands may determine a change in a game state for the video game, such as that based on a respective user action for a respective user or a respective set of users. Such dynamically generated macro-blocks may correspond to objects in the video game, such as one or more sprites (i.e., programmable, movable, high-resolution graphic images, which are also referred to as movable object blocks).

In some embodiments, a subset of the plurality of pre-encoded macro-blocks may include un-compressed pixel information as well as compressed, pre-encoded pixel data. During generation of the one or more frames of video, the dynamically generated macro-blocks may include a combination of the un-compressed pixel information for a plurality of pre-encoded macro-blocks and image information corresponding to one or more objects. The combination may include blending and/or superimposing the image information corresponding to the one or more objects with the uncompressed pixel information.

The method and system transmit the generated video-game content to a user device for display. The generated video-game content may correspond to difference information relative to previous video-game content transmitted to the user device. The system allows multiple sets of users to simultaneously and independently play a single executable copy the video game. A respective set of users may include one or more users. Each set of users may have a respective game state for the video game. In this way, the system improves an efficiency of resource utilization and an overall cost effectiveness.

In an exemplary embodiment, the method and system are compatible with an MPEG compression standard, including MPEG2. This compatibility allows the one or more frames of video generated using the method and system to be displayed using commercially available chip sets.

Video Game System

FIG. 1 is a block diagram illustrating an embodiment of a cable television system 100 for receiving orders for and providing content, such as one or more video games, to one or more users (including multi-user video games). Several content data streams may be transmitted to respective subscribers and respective subscribers may, in turn, order services or transmit user actions in a video game. Satellite signals, such as analog television signals, may be received using satellite antennas 144. Analog signals may be processed in analog headend 146, coupled to radio frequency (RF) combiner 134 and transmitted to a set-top box (STB) 140 via a network 136. In addition, signals may be processed in satellite receiver 148, coupled to multiplexer (MUX) 150, converted to a digital format using a quadrature amplitude modulator (QAM) 132-2 (such as 256-level QAM), coupled to the radio frequency (RF) combiner 134 and transmitted to the STB 140 via the network 136. Video on demand (VOD) server 118 may provide signals corresponding to an ordered movie to switch 126-2, which couples the signals to QAM 132-1 for conversion into the digital format. These digital signals are coupled to the radio frequency (RF) combiner 134 and transmitted to the STB 140 via the network 136. The STB 140 may display one or more signals, include those corresponding to video-game content discussed below, on television or other display device 138. While FIG. 1 illustrates one subscriber STB 140 and television or other display device 138, in other embodiments there may be additional subscribers, each having one or more STBs and/or televisions or other display devices.

The cable television system 100 may also include an application server 114 and a plurality of game servers 116. The application server 114 and the plurality of game servers 116 may be located at a cable television system headend. While a single instance or grouping of the application server 114 and the plurality of game servers 116 are illustrated in FIG. 1, other embodiments may include additional instances in one or more headends. The servers and/or other computers at the one or more headends may run an operating system such as Windows, Linux, Unix, or Solaris.

The application server 114 and one or more of the game servers 116 may provide video-game content corresponding to one or more video games ordered by one or more users. In the cable television system 100 there may be a many-to-one correspondence between respective users and an executed copy of one of the video games. The application server 114 may access and/or log game-related information in a database. The application server 114 may also be used for reporting and pricing. One or more game engines (also called game engine modules) 1848 (FIG. 18) in the game servers 116 are designed to dynamically generate video-game content using pre-encoded blocks. In an exemplary embodiment, the game servers 116 use encoding that is compatible with an MPEG compression standard.

The video-game content is coupled to the switch 126-2, converted to the analog format in the QAM 132-1. In an exemplary embodiment with 256-level QAM a narrowcast sub-channel (having a bandwidth of approximately 6 MHz, which corresponds to approximately 38 Mbps of digital data) may be used to transmit 10 to 30 video-game data streams for a video game that utilizes between 1 and 4 Mbps.

These digital signals are coupled to the radio frequency (RF) combiner 134 and transmitted to STB 140 via the network 136. The Applications server 114 may also access, via Internet 110, persistent player or user data in a database stored in multi-player server 112. The applications server 114 and the plurality of game servers 116 are further described below with reference to FIG. 18.

The STB 140 may include a client application, such as games 142, that receives information corresponding to one or more user actions and transmits the information to one or more of the game servers 116. The game applications 142 may also store video-game content prior to updating a frame of video on the television 138. The television 138 may be compatible with an NTSC format or a different format, such as PAL or SECAM. The STB 140 is described further below with reference to FIG. 18.

The cable television system 100 may also include STB control 120, operations support system 122 and billing system 124. The STB control 120 may process one or more user actions, such as those associated with a respective video game, that are received using an out-of-band (OOB) sub-channel using return pulse amplitude (PAM) demodulator 130 and switch 126-1. There may be more than one OOB sub-channel. While the bandwidth of the OOB sub-channel(s) may vary from one embodiment to another, in one embodiment, the bandwidth of each OOB sub-channel corresponds to a bit rate or data rate of approximately 1 Mbps. The operations support system 122 may processes a subscriber's order for a respective service, such as the respective video game, and update the billing system 124. The STB control 120, the operations support system 122 and/or the billing system 124 may also communicate with the subscriber using the OOB sub-channel via the switch 126-1 and the OOB module 128, which converts signals to a format suitable for the OOB sub-channel. Alternatively, the operations support system 122 and/or the billing system 124 may communicate with the subscriber via another communications link such as an Internet connection or a communications link provided by a telephone system.

The various signals transmitted and received in the cable television system 100 may be communicated using packet-based data streams. In an exemplary embodiment, some of the packets may utilize an Internet protocol, such as User Datagram Protocol (UDP). In some embodiments, networks, such as the network 136, and coupling between components in the cable television system 100 may include one or more instances of a wireless area network, a local area network, a transmission line (such as a coaxial cable), a land line and/or an optical fiber. Some signals may be communicated using plain-old-telephone service (POTS) and/or digital telephone networks such as an Integrated Services Digital Network (ISDN). Wireless communication may include cellular telephone networks using an Advanced Mobile Phone System (AMPS), Global System for Mobile Communication (GSM), Code Division Multiple Access (CDMA) and/or Time Division Multiple Access (TDMA), as well as networks using an IEEE 802.11 communications protocol, also known as WiFi, and/or a Bluetooth communications protocol.

While FIG. 1 illustrates a cable television systems, the system and methods described may be implemented in a satellite-based system, the Internet, a telephone system and/or a terrestrial television broadcast system. The cable television system 100 may include additional elements and/or remove one or more elements. In addition, two or more elements may be combined into a single element and/or a position of one or more elements in the cable television system 100 may be changed.

Attention is now directed towards several embodiments of methods of operations for generating one or more frames of video using pre-encoded macro-blocks. These methods may be implemented in the cable television system 100 to provide content, including one or more video games, to one or more users. As noted above, a macro-block corresponds to a set of pixels. In an exemplary embodiment of encoding of macro-blocks using an MPEG-compatible compression standard, such as MPEG2, a block may correspond to an 8-by-8 array of pixels and a macro-block may correspond to a 16-by-16 array of pixels.

Generating One or More Frames of Video

Figure 2:
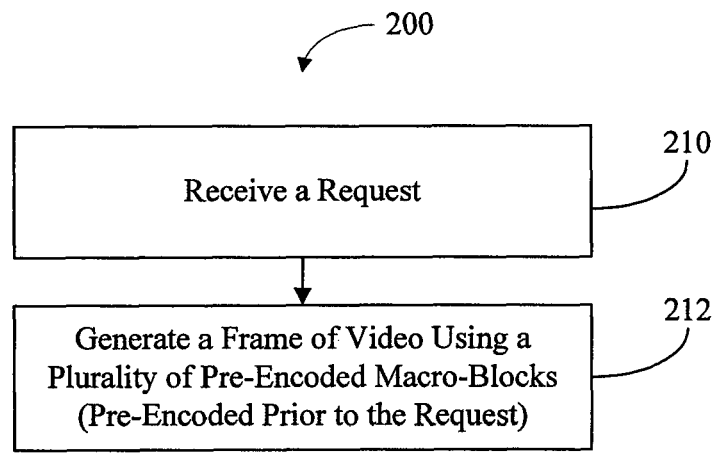
FIG. 2 is a flow diagram illustrating an embodiment of a process of generating at least a frame of video.

FIG. 2 is a flow diagram illustrating an embodiment of a process 200 of generating a frame of video. A request is received (210). The request may initiate a video game. A frame of video is generated using a plurality of pre-encoded macro-blocks (i.e., macro-blocks that are pre-encoded prior to the request) (212). The process 200 may include fewer operations or additional operations. In addition, two or more operations may be combined and/or the order of the operations may be changed.

Figure 3:
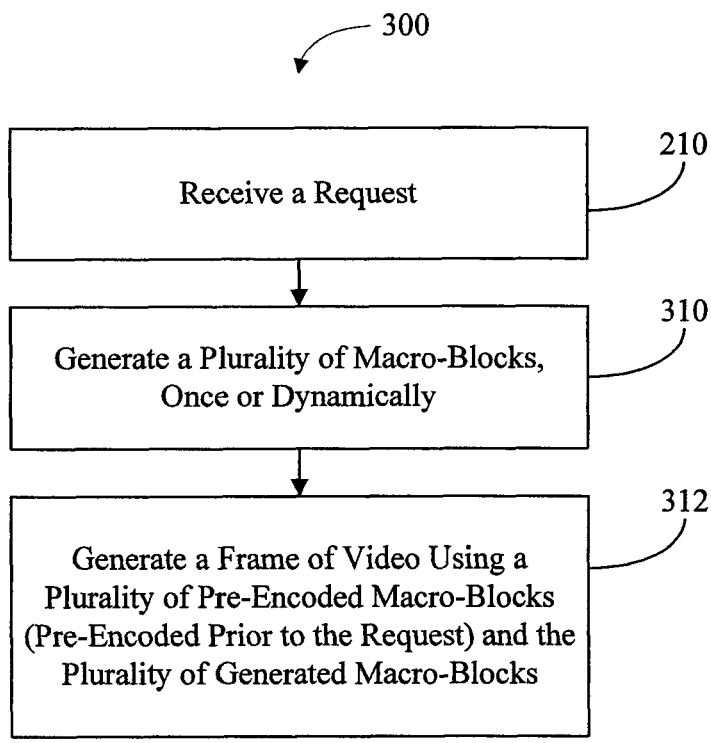
FIG. 3 is a flow diagram illustrating an embodiment of a process of generating at least a frame of video.

FIG. 3 is a flow diagram illustrating an embodiment of a process 300 of generating a frame of video. As in the process 200 described above, a request is received (210). A plurality of macro-blocks are generated once or dynamically (310). A frame of video is generated using a plurality of pre-encoded macro-blocks (that are pre-encoded prior to the request) and the plurality of generated macro-blocks (312). The process 300 may include fewer operations or additional operations. In addition, two or more operations may be combined and/or the order of the operations may be changed.

Figure 4:
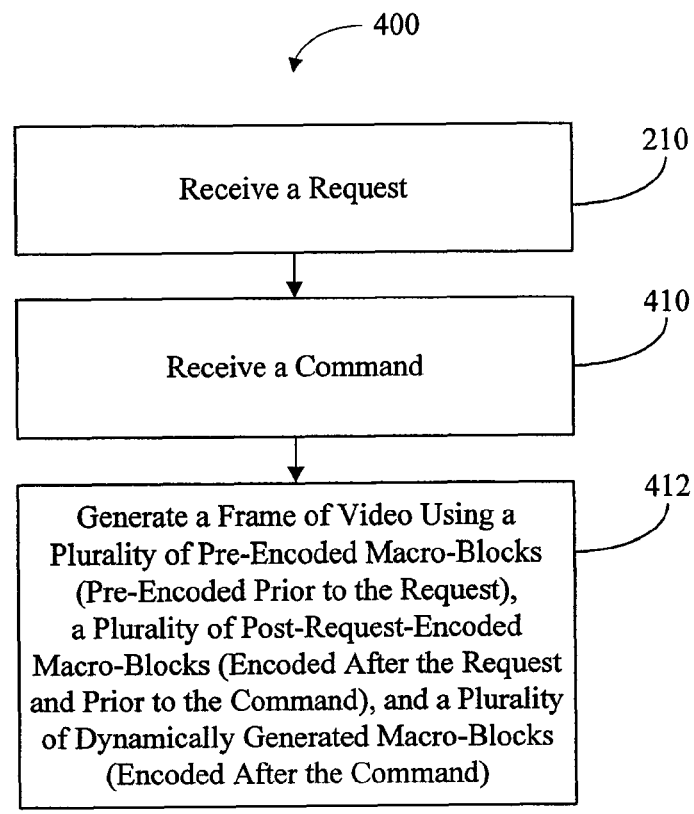
FIG. 4 is a flow diagram illustrating an embodiment of a process of generating at least a frame of video.

FIG. 4 is a flow diagram illustrating an embodiment of a process 400 of generating a frame of video. Once again, the process 400 includes receiving a request (210). In addition, a command is received (410). The command may correspond to a user action or an action of a set of users in a video game. After receiving the command, and in response to the command, a frame of video is generated using a plurality of pre-encoded macro-blocks (that are pre-encoded prior to receiving the request), a plurality of post-encoded macro-blocks (encoded after receiving the request and prior to receiving the command), and a plurality of dynamically generated macro-blocks (encoded after receiving the command) (412). The process 400 may include fewer operations or additional operations. In addition, two or more operations may be combined and/or the order of the operations may be changed.

Figure 5:
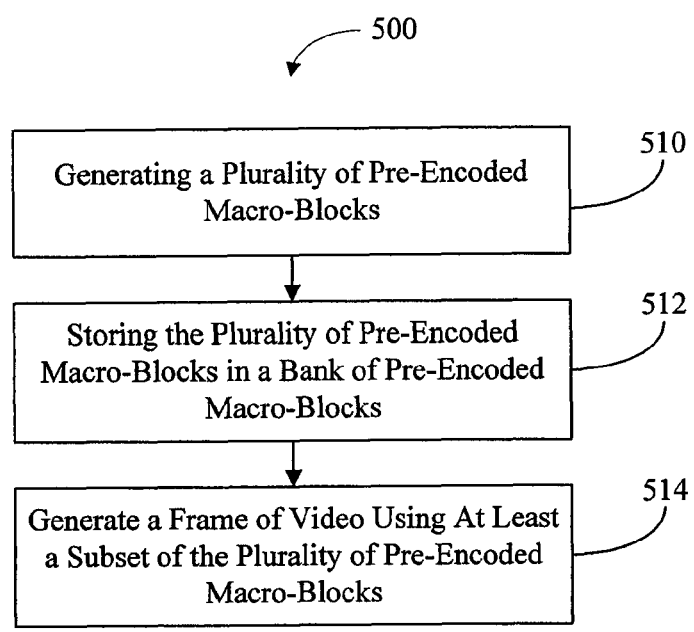
FIG. 5 is a flow diagram illustrating an embodiment of a process of generating at least a frame of video.

FIG. 5 is a flow diagram illustrating an embodiment of a process 500 of generating a frame of video. A plurality of pre-encoded macro-blocks are generated (510). The plurality of pre-encoded macro-blocks are stored in a bank of pre-encoded macro-blocks (512). A frame of video is generated using at least a subset of the plurality of pre-encoded macro-blocks (514). The process 500 may include fewer operations or additional operations. In addition, two or more operations may be combined and/or the order of the operations may be changed.

The pre-encoded macro-blocks in embodiment 500 may be individually accessible allowing a subset of the plurality of pre-encoded macro-blocks to be shared between two or more video games, to be shared between two or more frames of video, and/or to be shared between two or more instances of a video game. A subset of the stored plurality of pre-encoded macro-blocks may include un-compressed pixel information. As discussed below with reference to FIG. 10, providing pre-encoded macro-blocks that also include un-compressed pixel information allows dynamic macro-blocks to be generated that combine image information corresponding to an object with the uncompressed pixel information from one or more pre-encoded macro-blocks.

Figure 6:
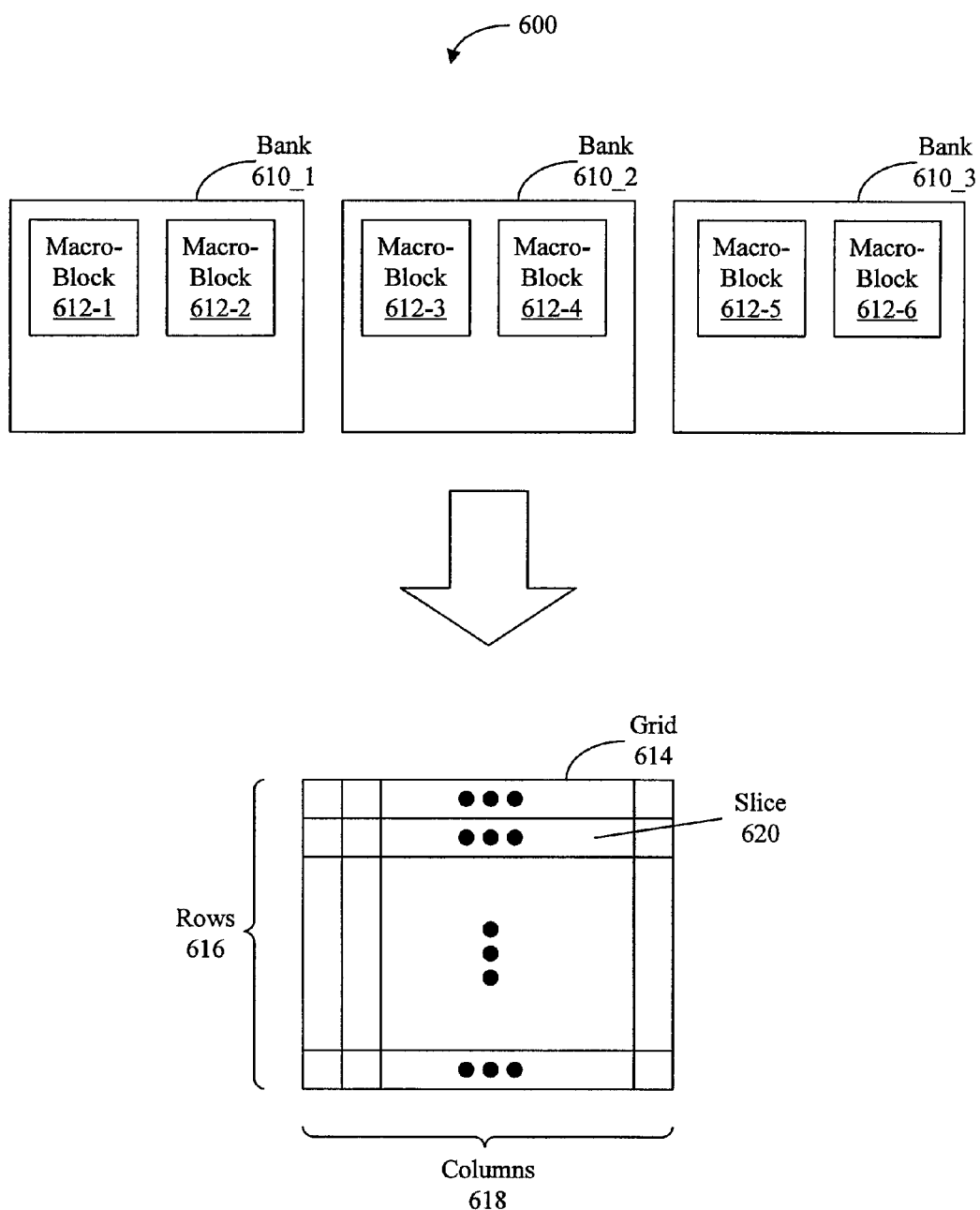
FIG. 6 is a block diagram illustrating an embodiment of one or more banks of pre-encoded macro-blocks and a reference grid.

Attention is now directed towards several embodiments of pre-encoding and one-time and/or dynamically generation of macro-blocks for use in generating a frame of video. FIG. 6 is a block diagram illustrating an embodiment 600 of one or more banks 610 of pre-encoded macro-blocks 612 and a 2-dimensional tile, array or reference grid 614. The number of pre-encoded macro-blocks 612 that are included in the banks 610 may depend on the respective video game that will use the pre-encoded macro-blocks and the amount of predictable animation associated the with video game. Thus simple games, with simple animations have fewer pre-encoded macro-blocks than complex games with more scenes, characters and predictable animations. In exemplary embodiments there are approximately 16,000, 50,000, 60,000 or 100,000 pre-encoded macro-blocks 612. The reference grid 614 is arranged in a plurality of rows 616 and columns 618 that sub-divide the reference grid 614 into a plurality of boxes. Each row 616 corresponds to a slice 620 in a frame of video. Each box of the grid 614 (each entry in the grid) stores an index or a pointer for identifying and positioning a macro-block when generating a frame of video. A plurality of the grid entries may reference pre-encoded macro-blocks, while other grid entries in the grid 614 reference dynamically generated macro-blocks (i.e., macro-blocks generated after the initiation of game execution, such as macro-blocks generated in response to a latest or recent command by a user of the game). In other words, each box in the grid 614 stores a pointer or reference to a respective macro-block (at least some of which are pre-encoded macro-blocks), and the position of the box in the grid 614 identifies the position of the identified macro-block in a video frame. In an exemplary embodiment, the macro-blocks (including the pre-encoded macro-blocks 612) each represent a 16-by-16 array of pixels, and there are 30 rows 616 and 40 columns 618 of macro-blocks or grid entries corresponding to a VGA video frame. In other embodiments, there are 30 rows and 45 columns of macro-blocks or grid entries corresponding to a digital embodiment of NTSC.

In many video games, at least a subset of the content in a respective frame of video may be substantially unchanged with respect to a previous or subsequent frame of video. This situation may arise in a video game be because a user has not entered a command (such as providing instructions using a user interface device), i.e., there hasn't been a user action. Alternatively, depending on the respective video game, there may be a subset of the content that is not user addressable, i.e., that is unaffected even if the user enters a command (for example, an image in the background of the frame of video). This information is available to the game developer and may be utilized to select which macro-blocks to pre-encode or compress, and which macro-blocks to both pre-encode and also store un-compressed pixel information. The macro-blocks identified by the reference grid 614 may be modified in accordance with a game state for the respective video game, i.e., in accordance with user commands. A synthesizer module 1852 (FIG. 18) in a respective game engine 1848 (FIG. 18) may use a current state of the reference grid 614 to select and/or position an appropriate subset of the pre-encoded macro-blocks 612 at appropriate indices (or using appropriate pointers) in the reference grid 614 to generate a frame of video. In addition to allowing game resources to be shared, this approach may also reduce the infrastructure and/or the cost associated with generating frames of video corresponding to one or more video games. In particular, generating the frame of video may involve a comparison of two indices or pointers (to macro-blocks), corresponding to a previous state of the reference grid 614 and the current state of the reference grid 614, as opposed to comparison of all the pixels in the corresponding macro-blocks.

Figure 7:
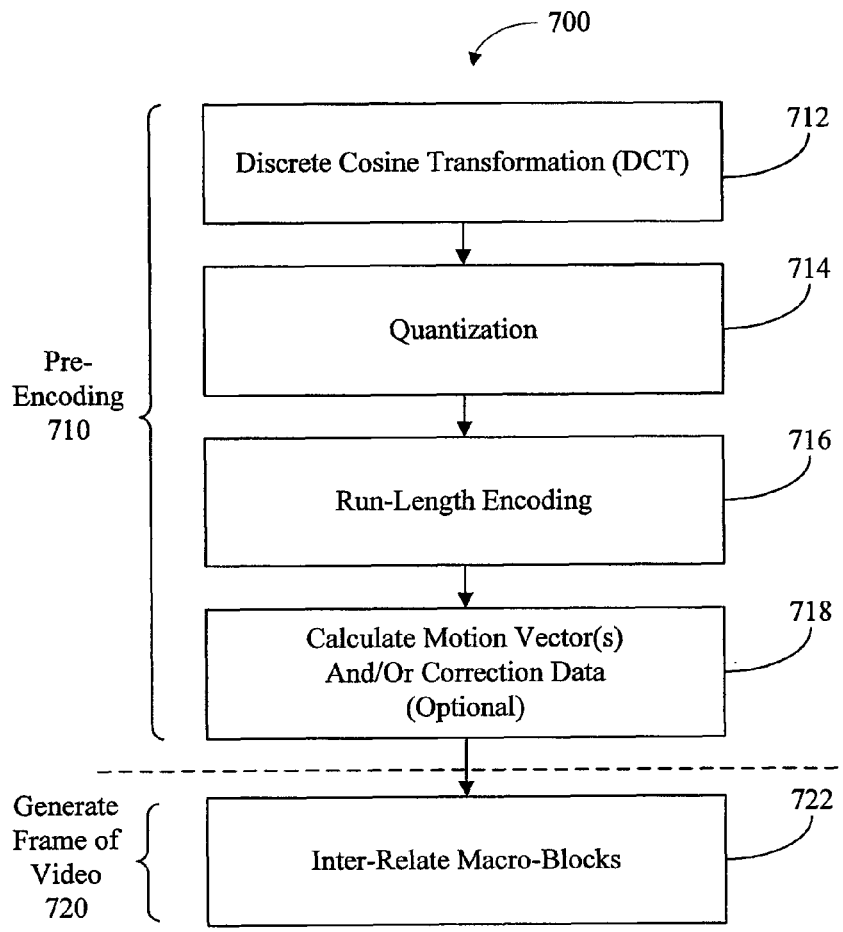
FIG. 7 is a flow diagram illustrating an embodiment of a process of generating at least a frame of video.

FIG. 7 is a flow diagram illustrating an embodiment 700 of a process of generating at least a frame of video. Operations in embodiment 700 may be grouped in pre-coding operations 710 and video frame generating operations 720. The pre-coding operations 710 may be performed in one or more game servers 116 (FIG. 1) and/or the pre-coding operations 710 may be performed by a game developer or game distributor prior to the loading of game assets onto the cable television system 100 (FIG. 1). Pre-coding operations 710 include performing a two-dimensional discrete cosine transformation (DCT) (712), quantization (714) and run-length encoding (716) of one or more macro-blocks (such as the pre-encoded macro-blocks 612 in FIG. 6) and/or on one or more blocks in a respective macro-block. As discussed further below with reference to FIG. 8, the DCT (712) results in a several DC coefficients and several sets of AC coefficients that corresponding to image information for the macro-block. The quantization (714) includes determining a quantization factor for a respective macro-block. The run-length encoding (716) may include a Huffman encoding operation.

The pre-coding operations 710 may optionally include calculating one or more motion vectors (to a nearest half pixel) and/or correction data (718), which is added to a macro-block after a displacement corresponding to one of the motion vectors to obtain a final macro-block in the frame of video. Pre-coding a motion vector for a macro-block is particularly useful when a video game includes a known animation sequence that repeats during execution of the video game. Pre-coding more than motion vector for a macro-block may be useful when an object in a video game moves in different directions during different animation sequences. The resulting one or more motion vectors and/or correction data may be stored in corresponding macro-blocks 612 (FIG. 6) in one or more of the banks 610 (FIG. 6). Note that pre-encoding motion vectors (i.e., calculating the one or more motion vectors and/or correction data 718) is distinct from dynamic motion estimation (i.e., on the fly motion estimation) that is implemented in MPEG-compatible compression, such as MPEG2.

During generation of the frame of video (720), adjacent macro-blocks are interrelated (722). The interrelating operation (722) may include determining one or more DC coefficients, completing the calculation of one or more motion vectors and/or correction data, and/or the quantization factor for the respective macro-block. A resulting data stream of macro-blocks may be compatible with an MPEG compression standard. In an exemplary embodiment, the pre-coding 710 may complete substantially 90% of the encoding needed to generate an MPEG compatible frame of video. The last 10% includes determining relative information, which depends on information in previous or subsequent macro-blocks, and is accomplished by interrelating (722) spatially and/or temporally adjacent macro-blocks. Determining the one or more DC coefficients is discussed further below with reference to FIGS. 8 and 9, determining of the quantization factor is discussed further below with reference to FIG. 9, and completing the calculation of one or more motion vectors and/or correction data is also discussed further below with reference to FIG. 10.

The flow diagram 700 may include fewer operations or additional operations. In addition, two or more operations may be combined and/or the order of the operations may be changed.

Figure 8:
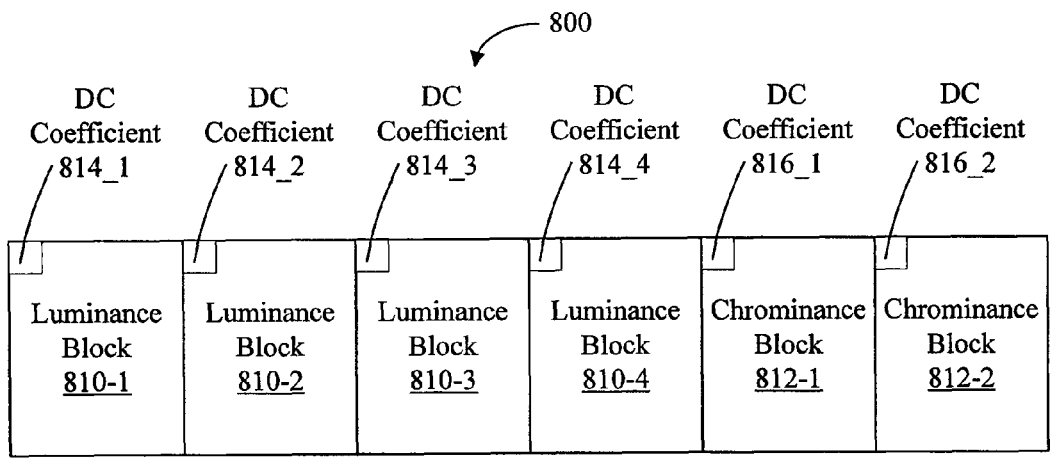
FIG. 8 is a block diagram illustrating an embodiment of chrominance and luminance blocks in a macro-block.

FIG. 8 is a block diagram illustrating an embodiment 800 of chrominance and luminance blocks in a macro-block. The macro-block includes four luminance (Y) blocks 810 and two chrominance (U and V) blocks 812. The blocks 810 and 812 include AC and DC coefficients associated with the pre-encoding 710 illustrated in FIG. 7. In an exemplary embodiment, the luminance blocks 810 correspond to 8×8 arrays of pixels, one chrominance block (such as chrominance block 812-1) corresponds to U information for the macro-block and one chrominance block (such as chrominance block 812-2) corresponds to V information for the macro-block. In other embodiments, the macro-block may be generated based on composite video information, such as RGB, and the blocks in embodiment 800 may be modified accordingly.

Figure 9:
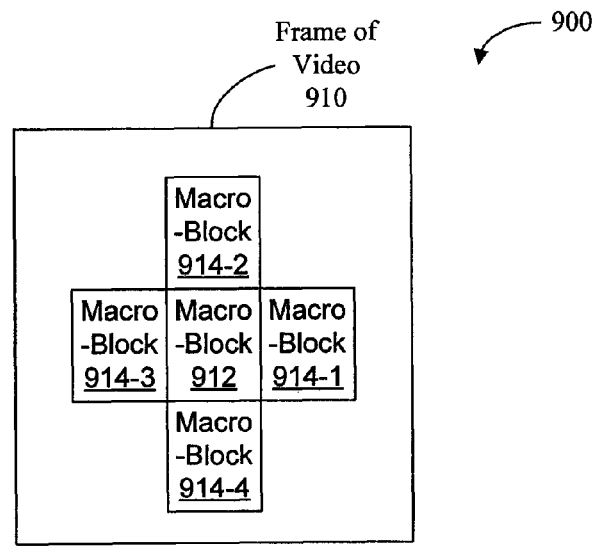
FIG. 9 is a block diagram illustrating an embodiment of inter-relating adjacent macro-blocks.

Each luminance block 810 in FIG. 8 has a DC coefficient 814 and each chrominance block 812 has a DC coefficient 816. The DC coefficients 814 and 816 specify an average brightness and chrominance (red or blue), respectively, for the macro-block. The DC coefficients 814 and 816 are represented in the macro-block 800 as values relative to the DC coefficients for adjacent blocks. Thus, DC coefficient 814_2 is represented by the difference between the DC coefficient for luminance block 810-2 and the DC coefficient for luminance block 810-1; DC coefficient 814_3 is represented by the difference between the DC coefficient for luminance block 810-3 and the DC coefficient for luminance block 810-2; DC coefficient 814_4 is represented by the difference between the DC coefficient for luminance block 810-4 and the DC coefficient for luminance block 810-3; i.e., these DC coefficients 814 are determined 'internal' to the macro-block. DC coefficient 814_1, DC coefficient 816_1 and DC coefficient 816_2 are determined relative to an adjacent macro-block. This is illustrated in FIG. 9, which is a block diagram illustrating an embodiment 900 of inter-relating adjacent macro-blocks. Specifically, at least 3 DC coefficients for macro-block 912 may be determined using one or more adjacent macro-block 914 in a frame of video 910. In an exemplary embodiment, macro-block 914_3 is used as the adjacent macro-block when computing the representation of the DC coefficients for macro-block 912.

If the quantization factor for the macro-block 912 is different from the quantization factor of an adjacent macro-block, such as the macro-block 914_3, the interrelating operation (722) in FIG. 7 may include adding the quantization factor to a header for the macro-block 912 in a data stream corresponding to the frame of video 910.

As discussed previously, since animation sequences that repeat a pre-determined sequence of macro-blocks in a linear or circular fashion are known to a game developer, these macro-blocks may be pre-encoded and stored (for example, in one or more of the banks 610 in FIG. 6) with one or more motion vectors and/or correction data. The motion vectors and/or correction data calculated (718) (FIG. 7) during pre-encoding (710) (FIG. 7) contain relative information. As a consequence, when the frame of video is generated (720) (FIG. 7) the calculation may be completed (i.e., adjacent macro-blocks may be interrelated and the motion vector and/or the correction data may be finalized). In MPEG-compatible embodiments, when the frame of video containing one of these animation sequences is transmitted, instead of transmitting a full intra-coded macro-block a predictive macro-block including motion vector and delta or difference information with respect to a region of the previous video frame of video may be transmitted. The motion vector in a predictive macro-block indicates the location of an array of pixels (e.g., a 16 by 16 array of pixels) to be used as the starting point for constructing a tile of the current video frame. The motion vector indicates a position relative to the tile, such as Tx+X pixels and Ty+Y, where Tx,Ty is the tile position and X,Y is the relative position specified by the motion vector. The motion vector may point to an array that overlaps two or four tiles of the previous video frame. When the motion vector has a null value, the starting point for the tile is the tile's pixel array in the previous video frame. The delta or difference information specifies how to modify the starting point pixel array to produce the pixel array for a tile in the current video frame. Note that MPEG-compatible compression, such as MPEG2, has several types of macro-blocks. An intra-coded macro-block is self contained, i.e., it contains all the information needed to define image information for a corresponding set of pixels in the frame of video. Predictive macro-blocks contain a range of information, ranging from an empty macro-block (only a header is transmitted) to a macro-block containing both a motion vector and delta or difference information (i.e., relative information). MPEG2 compression and the various types of macro-blocks are discussed further below with reference to FIGS. 12-14.

The pre-encoding (710) (FIG. 7) may include a motion search of adjacent macro-blocks to calculate the motion vector and/or correction data (718) (FIG. 7). During generation of the frame of video (720) (FIG. 7), the synthesizer module 1852 (FIG. 18) in a respective game engine 1848 (FIG. 18) may verify that the motion estimation (the motion vector and/or correction data) calculated during the pre-encoding (710) (FIG. 7) is correct for the current game state (for example, that a dialog box does not overlay the macro-blocks in the animation sequence). This may be implemented by checking for the presence of corresponding macro-block indices in the reference grid 614 (FIG. 6) at one or more expected locations in a previous frame of video. In an exemplary embodiment, one known object in a respective animation sequence is tracked. For a motion vector having a half-pixel accuracy, comparisons with up to four previous macro-blocks overlapped by the source array of 16 by 16 pixels (or macro-block locations) may be performed.

Figure 10:
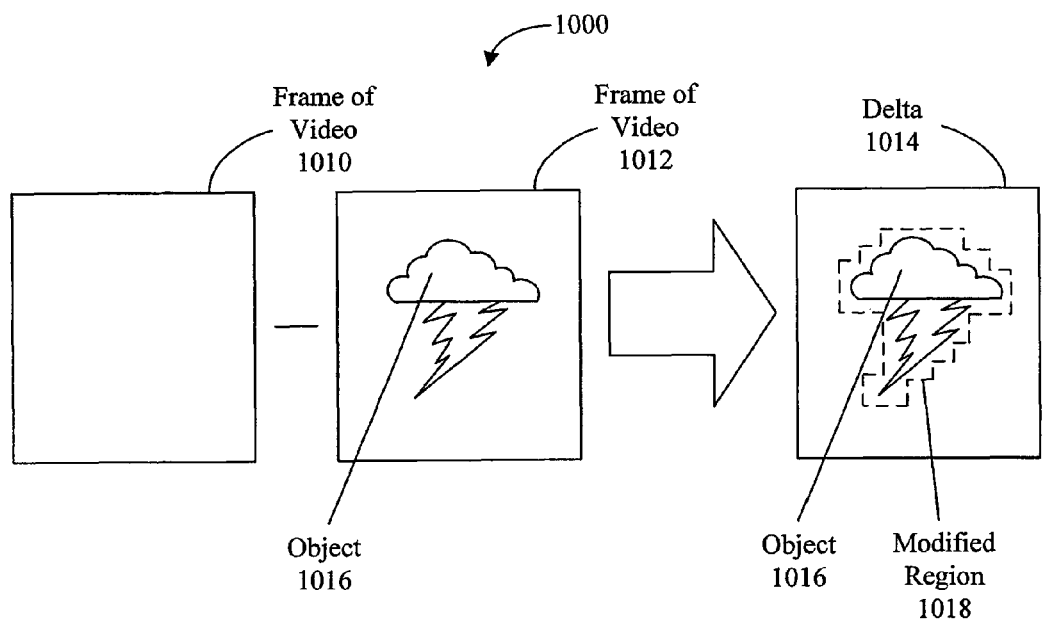
FIG. 10 is a block diagram illustrating an embodiment of comparing frames of video.

FIG. 10 is a block diagram illustrating an embodiment 1000 of comparing frames of video. A current frame of video 1012 is compared to a previous frame of video 1010 to identify an object 1016. The comparison results in a difference of delta 1014 map including the object 1016 and a corresponding modified region 1018. As described above, such a comparison may be used in motion estimation for pre-encoded animation sequences. As described below, it may also be used for generating frames of video containing objects or sprites using dynamically generated or encoded macro-blocks, as described in FIGS. 3 and 4, and described further below.

While various embodiments of systems and methods that use both pre-encoded macro-blocks and dynamically generated macro-blocks have been described, many additional embodiments using various combinations of pre-encoded and dynamically generated macro-blocks are possible. Depending on the number and speed of the processors in a video-game system (e.g., the system shown in FIG. 18), more or less of the image information in the one or more frames of video may be pre-encoded. In general, however, there are a subset of objects in a respective video game that are responsive to user commands. Since a behavior of these objects is unknown in advance, such objects may be encoded dynamically.

Given the additional time available to an encoder during the pre-encoding operations (710) (FIG. 7), the encoder may use floating-point arithmetic for operations such as the DCT (712) (FIG. 7). In addition, the quantization operation (714) (FIG. 7) may chose an optimal quantization factor for a respective macro-block from up to, say, 30 possible values. While such implementations may provide superior compression and/or image quality, they may be time consuming. As a consequence, dynamic encoding of objects or sprites may utilize fast encoding. Fast encoding may include fixed-point (integer) multiplication during the DCT operation (712) (FIG. 7). In addition, the quantization factor for the respective macro-block may be selected from a smaller set. For example, the quantization factor for the respective (16×16) macro-block may be the largest quantization factor for the four 8×8 blocks in the macro-block. If a resulting data rate exceeds a desired upper bound, the quantization factor that achieves the desired upper bound may be calculated directly. While this quantization factor may be sub-optimal (all the bits available may or may not be used), the calculation may be quicker than that used during pre-encoding (710) (FIG. 7). Thus, for dynamic encoding there may be a tradeoff between image quality and the overall encoding time.

Figure 11:
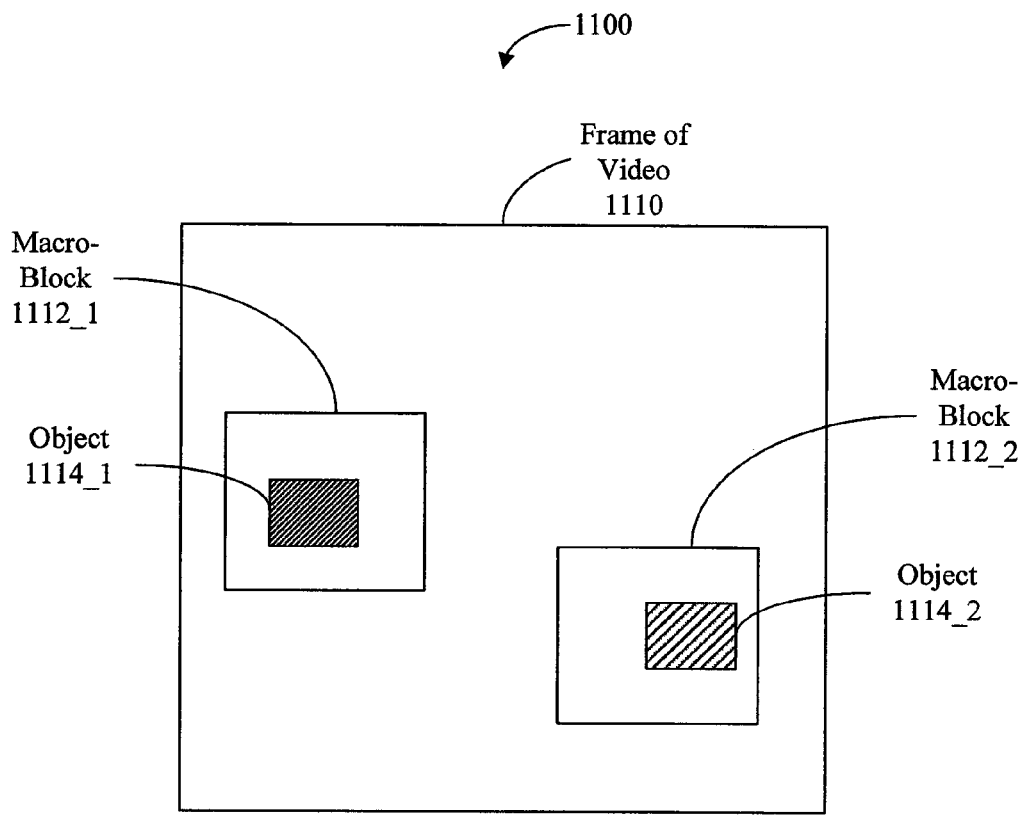
FIG. 11 is a block diagram illustrating an embodiment of combining pre-encoded macro-blocks and objects in a frame of video.

One or more dynamically generated macro-blocks corresponding to one or more objects or sprites may be combined with at least a portion of one or more pre-encoded macro-blocks. Combining macro-blocks and sprites may include blending or mixing and/or superposition. For example, blending may include alpha blending, where an effective transparency of the object or sprite is varied over a range of pixels. Superposition may utilize a chroma key, which may indicate what portion of the pre-encoded macro-blocks are background image information. Some of the pre-encoded macro-blocks 612 (FIG. 6) may include, in addition to the pre-encoded pixel information, un-compressed pixel information to facilitate the combining In an exemplary embodiment, the dynamically generated macro-blocks for the object or sprite of size m by n macro-blocks may correspond to the modified region 1018 (FIG. 10) and may include an array of m+1 by n+1 macro-blocks due to pixel accurate alignment. During the combining, the object or sprite may be combined with an n+1 by m+1 array of pre-encoded macro-blocks. FIG. 11 is a block diagram illustrating an embodiment 1100 of combining pre-encoded macro-blocks 1112 and objects 1114 in a frame of video 1110. Object 1114_1 is superimposed over macro-block 1112_1. Object 1114_2 is blended with macro-block 1112_2.

In light of the preceding description, during a video game the current frame of video may be generated in accordance with the current game state using the reference grid 614 (FIG. 6). Appropriate pre-encoded macro-blocks 612 (FIG. 6) may be assembled based on corresponding indices in the reference grid 614 (FIG. 6). The appropriate pre-encoded macro-blocks may have been encoded prior to the beginning of the video game and/or at the beginning of the video game (for example, macro-blocks corresponding to a user name). The appropriate pre-encoded macro-blocks may be interrelated (722) (FIG. 7). One or more animation sequences may be included in the current frame of video. Position(s) or indices for one or more macro-blocks in the one or more animation sequences may be determined based on a comparison with a previous frame of video and/or using pre-encoded motion estimation (including one or more motion vectors and/or correction data). The pre-encoded motion estimation may also be interrelated (722) (FIG. 7) when the current frame of video is generated. Dynamically generated or encoded macro-blocks corresponding to an object or sprite, which is responsive to user commands in the video game, may be generated on the fly or in real time and combined into the current frame of video. The combining may include blending and/or superimposing the dynamically generated macro-blocks with at least a portion of the pre-encoded macro-blocks. To facilitate the combining, some of the pre-encoded macro-blocks may be stored with un-compressed pixel information.

Data Streams

Attention is now directed towards embodiments of a group of pictures (GOP) and the related data streams corresponding to one or more frames of video for a video game. In MPEG compression, such as MPEG2, there are several types of frames, including Intra (I) frames and Predictive (P) frames. I frames include a plurality of slices, each containing intra-coded macro-blocks (which were discussed previously). All of the macro-blocks in an I frame must be present. P frames contain a plurality of slices. The slices may include intra-coded macro-blocks and predictive macro-blocks (which were discussed previously). Each slice must have at least two macro-blocks (the first and last macro-block in the slice). Predictive macro-blocks may be empty (i.e., only a header is transmitted). Alternatively, one or more predictive macro-blocks in a slice may be skipped. An address increment in a subsequent macro-block indicates how many skipped macro-blocks there were. In the exemplary embodiment of a frame of video having 40 columns and 30 rows, there will be 30 slices. For a P frame, each slice will have at least a first and a last macro-block. Therefore, the address increment in the predictive macro-blocks in this embodiment ranges from 1 to 39.

In some embodiments, when a video game commences an I frame is transmitted. The I frame may correspond to an all black image to keep the resulting data rate below an upper bound. After the I frame is transmitted, the remainder of the data stream during the video game may utilize P frames. The P frames may contain relative or differential information from one frame of video to the next, i.e., the P frames may contain update information (note that DC coefficients may not need to be interrelated for predictive coded macro-blocks in P frames). Note that frames of video that use a common set of pre-encoded macro-blocks (as described in the preceding paragraph) may have substantially unchanged AC coefficients (corresponding to the DCT operation (712) in FIG. 7) and/or substantially unchanged quantization factors (corresponding to the quantization operation (714) in FIG. 7).

Image information in the current frame of video that is unchanged with respect to the previous frame of video may not be transmitted. This may be accomplished by transmitting one or more empty or skipped predictive macro-blocks. If an entire frame of video remains unchanged, a P frame containing skipped and empty predictive macro-blocks may be transmitted. In an exemplary embodiment, the empty P frame will have 30 slices each containing two empty predictive macro-blocks. Transmitting an empty P frame may also be used to keep a decoder 1914 (FIG. 19) in a STB 1900 (FIG. 19) from under flowing. The P frame may be transmitted as a sequence of slices spread out over a period of time. This may also assist in keeping the data rate below an upper bound. Such a bounded data rate may reduce the infrastructure and costs associated with providing one or more video games to one or more users in a networked environment such as the cable television system 100 (FIG. 1). For example, the bounded data rate may prevent a respective data stream for one or more users from temporarily utilizing a significant fraction of the available resources in the system or a network, such as the network 136 (FIG. 1). In exemplary embodiments, the upper bound may be 0.03, 0.1, 0.16, 0.25 or 0.33 of a corresponding MPEG data stream containing I frames. The data stream may include 30 P frames per second. In some embodiments, the conservation of transmission bandwidth achieved through the use of these techniques may enable a 20-fold increase in a number of users or user sets per game engine 1848 (FIG. 18) with respect to existing video-game systems.

As noted previously, for pre-encoded animation sequences in one or more frames of video either intra-coded macro-blocks or predictive coded macro-blocks, each containing at least a motion vector and/or correction data, may be used. The macro-block choice may depend on the amount of information to be transmitted. This, in turn, may depend on a complexity of the one or more frames of video and/or on the difference or delta from one frame of video to the next. In some embodiments, the choice is in accordance with the data rate. Note that pre-encoded macro-blocks corresponding to an animation sequence will have substantially unchanged AC coefficients (corresponding to the DCT operation (712) in FIG. 7) and/or quantization values (corresponding to the quantization operation (714) each time the sequence runs, i.e., each time the sequence is included in the data stream.

The use of P frames, and in particular predictive macro-blocks, may pose a challenge if an error occurs during transmission and/or decoding. Such errors may propagate from one frame of video to the next. To prevent unbounded propagation, a rolling update may be used. One or more slices containing intra-coded macro-blocks (i.e., one or more I frame slices) may be included in a P frame after a time interval. Over a period of time, including several P frames, a complete set of intra-coded macro-blocks (including at least one for every tile of the video frame) may be transmitted, thereby 'restoring' the a current frame of video to a known condition. For example, in a system in which the P frame rate is 30 frames per second, and each frame includes 30 slices, each P frame may include an respective I frame slice. As a result, all slices of the video frame are restored at least once per second. In another example, every second P frame includes a respective I frame slice, thereby restoring all slices of the video frame once per two seconds. In essence, such a rolling update may function as a form of error correction. The one or more slices of intra-coded macro-blocks may, therefore, be transmitted even if the frame of video remains substantially unchanged (for example, the game state is substantially unchanged).

Figure 12:
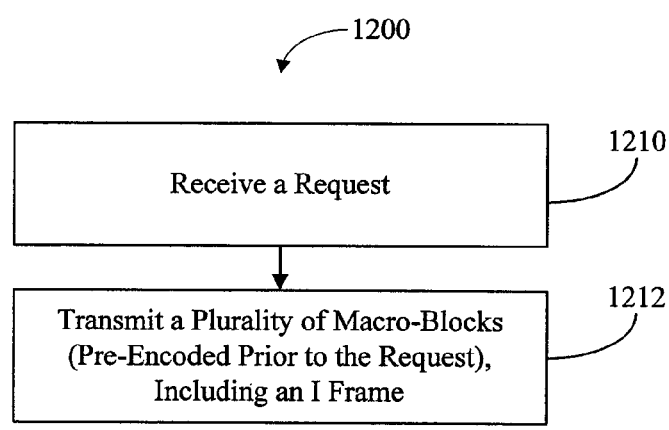
FIG. 12 is a flow diagram illustrating an embodiment of a process of generating a data stream corresponding to at least a frame of video.

FIG. 12 is a flow diagram illustrating an embodiment of a process 1200 of generating a data stream corresponding to at least a frame of video. A request is received (1210). For instance, the request may be a request to being execution of a video game. A plurality of macro-blocks (encoded prior to the request), including an I frame, are transmitted (1212). The process 1200 may include fewer operations or additional operations. In addition, two or more operations may be combined and/or the order of the operations may be changed.

Figure 13:
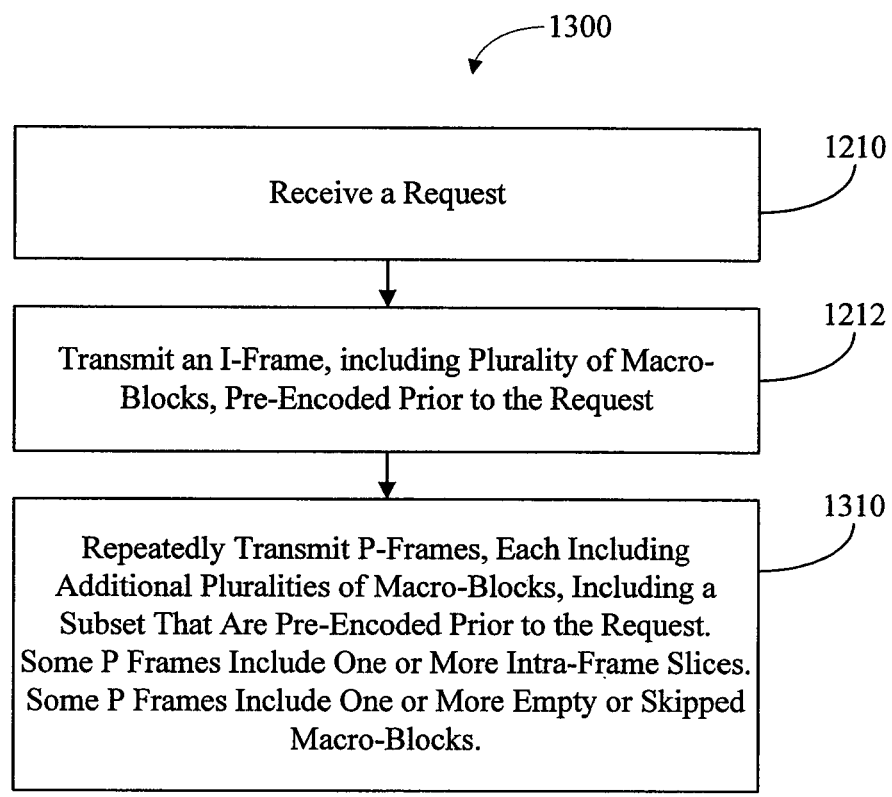
FIG. 13 is a flow diagram illustrating an embodiment of a process of generating a data stream corresponding to at least a frame of video.

FIG. 13 is a flow diagram illustrating an embodiment of a process 1300 of generating a data stream corresponding to at least a frame of video. The request is received (1210). The plurality of macro-blocks (encoded prior to the request), including an I frame, are transmitted (1212). A sequence of P frames, each including additional pluralities of macro-blocks, including a subset that are pre-encoded prior to the request are transmitted (1310). Some P frames include one or more intra-frame slices, as described above. Some P frames include one or more empty or skipped macro-blocks. The process 1300 may include fewer operations or additional operations. In addition, two or more operations may be combined and/or the order of the operations may be changed.

Figure 14:
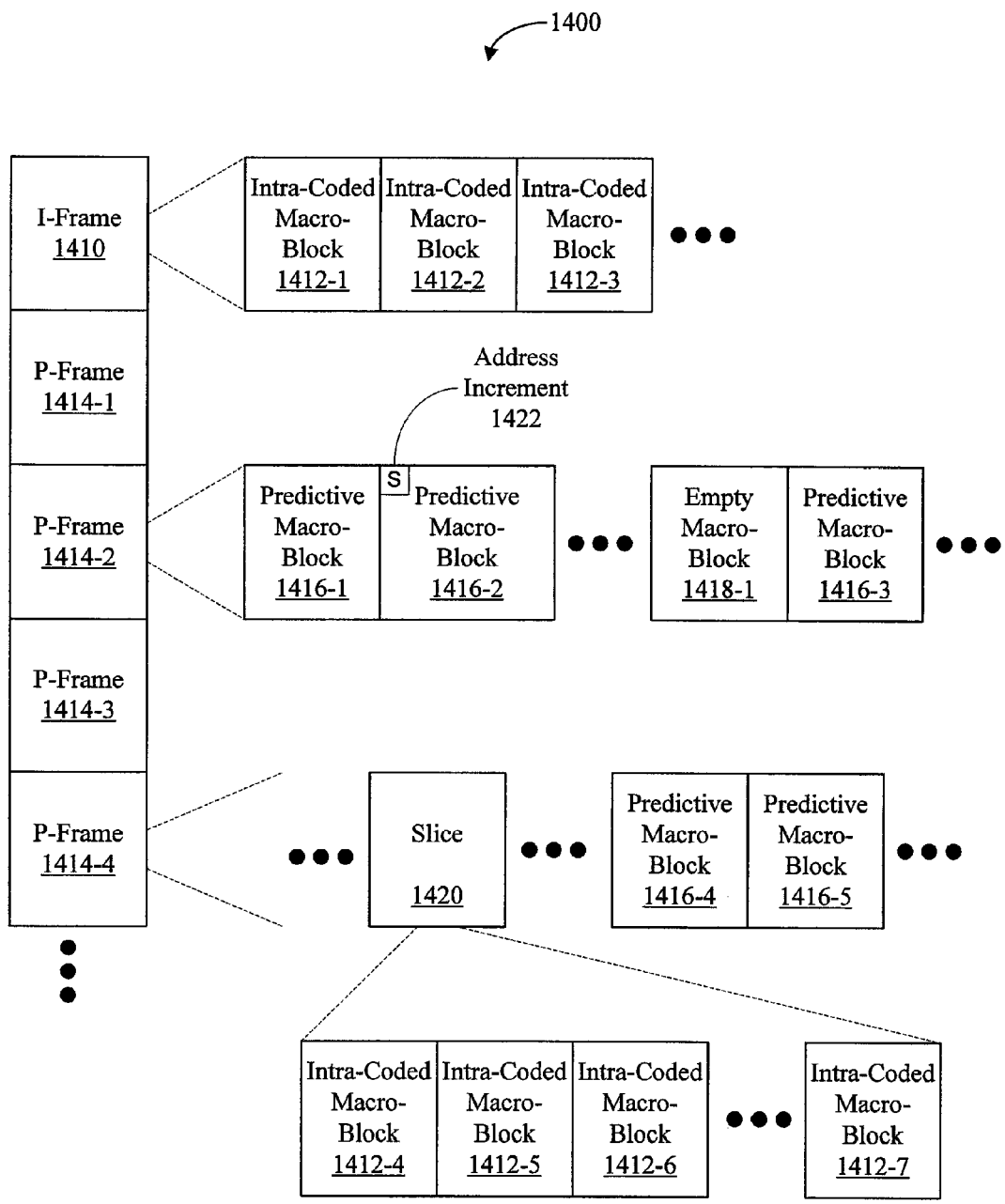
FIG. 14 is a block diagram illustrating an embodiment of a data stream corresponding to a sequence of video frames.

FIG. 14 is a block diagram illustrating an embodiment of a data stream 1400 that includes a sequence of video frames. An I frame 1410 and a plurality of P frames 1414 are transmitted. The I frame 1410 includes a plurality of intra-coded macro-blocks 1412. Some P frames 1414, such as P frame 1414-2, contain predictive macro-blocks 1416, one or more empty predictive macro-blocks 1418 and one or more skipped predictive macro-blocks. An address increment 1422 greater than 1 in a predictive macro-block indicates that one or more skipped predictive macro-blocks preceded the predictive macro-block, such as predictive macro-block 1416-2. Some P frames 1414, such as P frame 1414-4, also contain one or more slices, such as slice 1420. The slice 1420 includes intra-coded macro-blocks 1412.

Infinite Playing Field

Many existing video games include a large map corresponding to a playing field. One or more users scroll inside the map in accordance with user commands. The one or more users, however, only experience or see (for example, on a display) a small portion of the map at any instance in time. If the playing field is large (thousands of pixels in both dimensions), significant amounts of information may be conveyed to the STB 140 (FIG. 1) even though only a small portion is needed at any instance in time.

Some existing video games address this challenge using registers and the game state to define a current playing field, and thereby reduce the amount of information that may be conveyed to the STB 140 (FIG. 1) at any instance in time. The use of an MPEG-compatible data stream, such as the data stream 1400 (FIG. 14), may offer alternative approaches to implementing a playing field that effectively has an infinite extent while simultaneously reducing the amount of information that may be conveyed to the STB 140 (FIG. 1) at any instance in time.

In particular, MPEG2 defines two display extension headers that may be included in a packetized elementary stream 1614 (FIG. 16) corresponding to a frame of video. A sequence display extension (SDE) defines how much encoded information is displayed, i.e., a display size or magnification, and a picture display extension (PDE) defines an offset for each frame of video.

Figure 15:
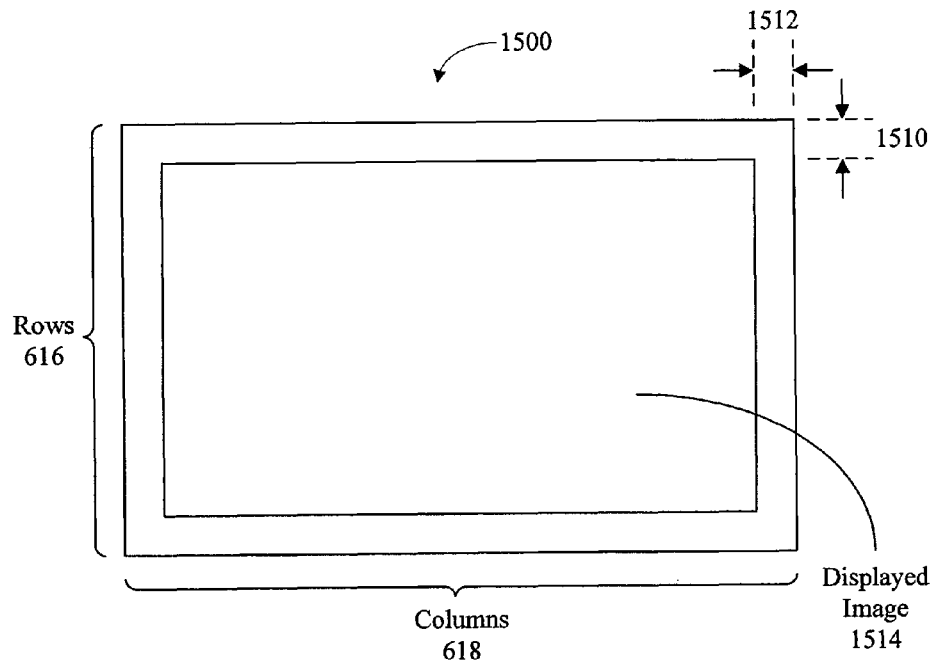
FIG. 15 is a block diagram illustrating an embodiment of an effective playing field in a frame of video.

In one embodiment, the SDE is used to define a visual portion of a macro-block that is smaller than the encoded information. As a consequence, the effective playing field is reduced compared to the full frame of video sent to the STB 140. This is illustrated in FIG. 15, which is a block diagram showing an embodiment of an effective playing field in a frame of video 1500. While the frame of video 1500 has a number of rows 616 and columns 618, a displayed image 1514 that is defined by the SDE and PDE has a guard band 1510 and 1512 in each dimension of the frame of video 1500. In an exemplary embodiment, there are 30 rows 616 of macro-blocks and 40 columns 618 of macro-blocks, and the guard bands 1510, 1512 are each 1 macro-block wide, i.e., the effective playing field that is actually displayed at any one time has a size corresponding to 29 macro-blocks by 39 macro-blocks.

If, for example, the user issues commands that move the displayed image 1514 to the right, a horizontal component of the PDE is incremented by 1. Should the horizontal component of the PDE exceed 15, the frame of video may be resent with all macro-blocks shifted to the right by 1 macro-block (a motion vector of 32 half pixels) and the PDE is reset to 0. Subsequently, if the user issues commands that continue to move the displayed image 1514 to the right, the frame of video may be re-sent when the horizontal component of the PDE exceeds 15. In this example, resending the frame of video would include sending a series of slices in a P frame, and each of the slices would contain two predictive macro-blocks with the motion vector and one intra-coded macro-block corresponding to new image information (on the right) that was now included in the displayed image 1514. In this way, the MPEG-compatible encoding of the data stream 1400 (FIG. 14) reduces the amount of information that is transmitted to the STB 140 (FIG. 1) and allows the playing field to have an effective extent that is effectively infinite.

Latency

Figure 19:
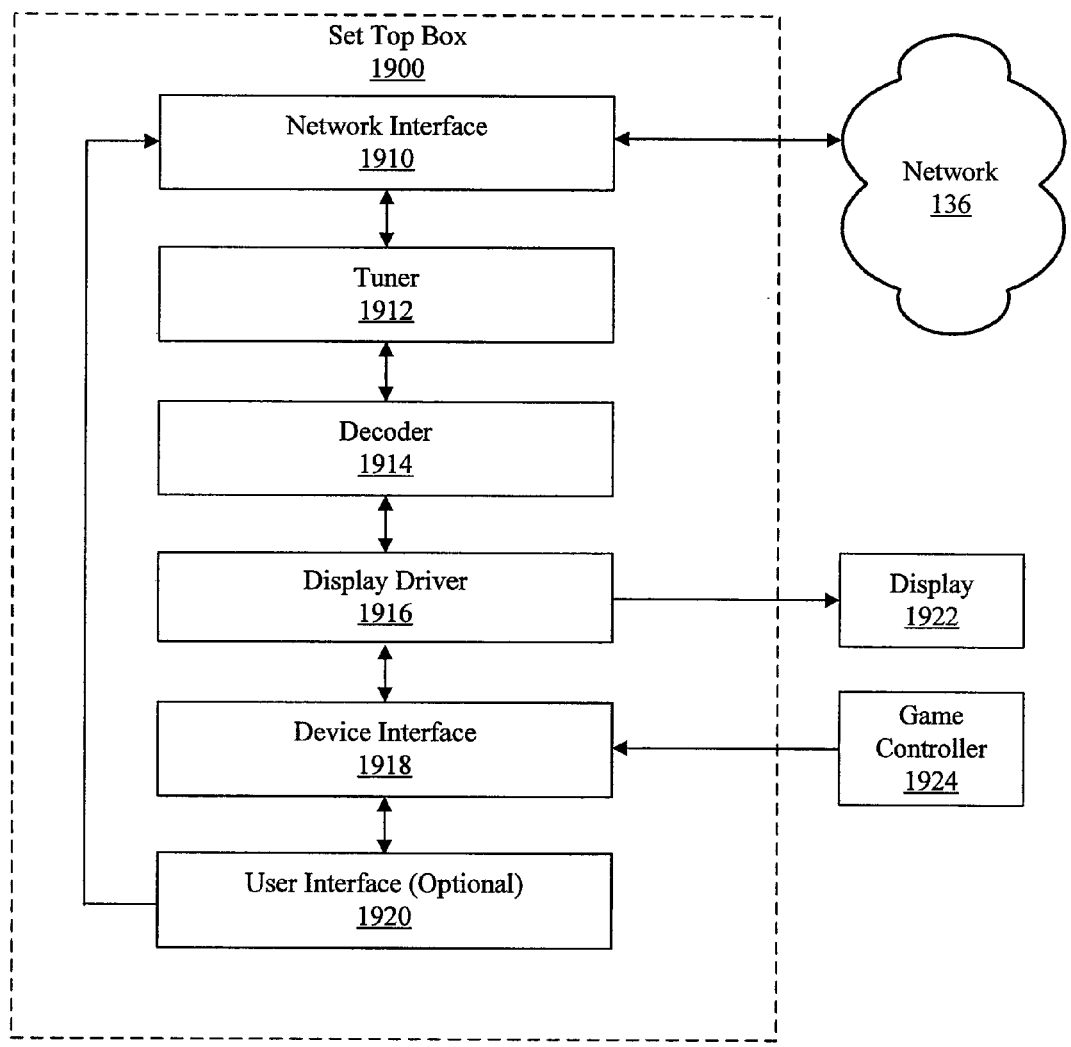
FIG. 19 is a block diagram illustrating an embodiment of a set top box.

Encoding the data stream 1400 (FIG. 14) invariably represents a tradeoff between complexity (the data rate) and the quality of the resulting image. In addition, the amount of information that may be transmitted is also a function of the amount of change from one frame of video to a subsequent frame of video, and the size of the data buffer in a decoder 1914 (FIG. 19). The data buffer size sets an upper bound on the decoding latency for frames of video in the STB 140.

Latency occurs because there is often a difference between a time of arrival of data at the decoder 1914 (FIG. 19) and a time when decoding of the data commences. Typically, a maximum latency is a time duration for transmitting a frame of video equal in size to the data buffer (since transmission of the respective frame of video must be complete when decoding starts). In existing systems using MPEG2 compression, the maximum latency is typically about 300 ms. These existing systems often use this time delay to send different amounts of information (I frames and/or P frames) as needed, i.e., transmission of one or more frames of video may be spread during this time interval. In this way, existing systems may keep the data rate bounded.

Video games pose several additional challenges in this regard. Unlike existing MPEG encoders, the data rate is not pre-allocated since the user commands (actions) are not known in advance, i.e., the video-game encoder may not be able to look ahead. As a consequence, the maximum latency is very low, for example, one frame period. In an exemplary embodiment, the latency at the encoder may be less than 50 ms (for example, 30 or 40 ms) and a round trip latency, including any delays associated with a remote control in a game controller 1924 (FIG. 19), may be less than 100 ms. The low latency implies that there is a limited time to transmit the frame of video (before decoding begins) and, thus, a limited time window in which to spread out information in the data stream 1400 (FIG. 14) in order to keep the data rate bounded.

The encoding approach described previously offers several advantages in this regard. Notably, the use of P frames allows information to be spread out, as needed, to keep the data rate bounded and accommodates low latency. In some embodiments, if the synthesizer module 1852 (FIG. 18) in the game engine 1848 (FIG. 18) determines that a number of bits in an update to the frame of video exceeds a transmit time for one frame period, one or more P frames containing only empty and/or skipped predictive macro-blocks (or alternately, containing a plurality of empty and/or skipped predictive macro-blocks) may be transmitted during a short time period (e.g., about 1 millisecond of an approximately 33.33 millisecond frame period), thereby preventing decoder 1914 (FIG. 19) underflow. The update information may then be transmitted in a P frame over a time period that exceeds one frame period, and in some cases is two or more frame periods. For example, three nearly empty P frames (corresponding to a previous frame of video) may be transmitted and then a P frame containing the update information (i.e., corresponding to the current frame of video) may be transmitted over approximately 3 to 3.9 frame periods, thereby keeping the data rate bounded. When this approach is used, the STB 140 (FIG. 1) may update the television 138 (FIG. 1) in a manner that reduces image changes and/or discontinuities. For example, the frame of video may be updated incrementally (as update information is received) or after all the update information is received.

Figure 16:
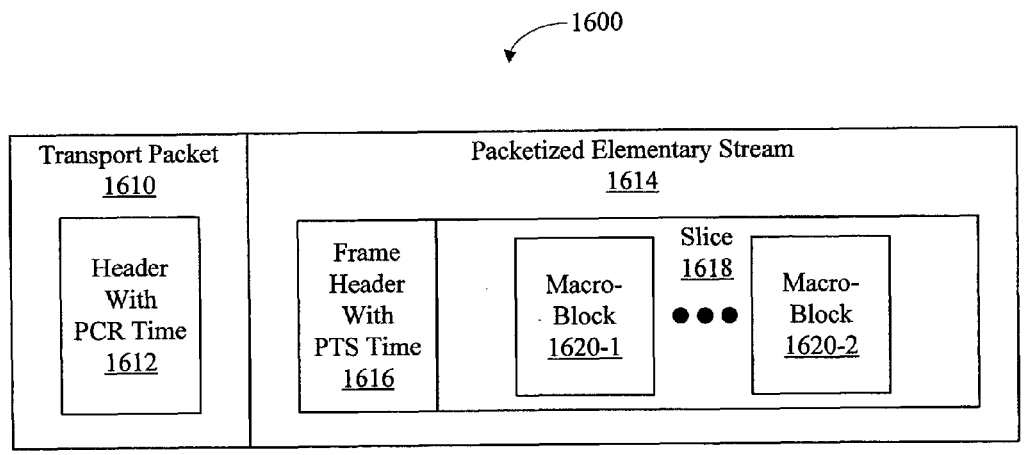
FIG. 16 is a block diagram illustrating an embodiment of a data stream.

MPEG data streams include headers that allow the encoder to synchronize itself (i.e., define the latency) with the decoder 1914 (FIG. 19), and these headers can be used to implement the above-described approach to keeping the data rate bounded. This is illustrated in FIG. 16, which shows a block diagram illustrating an embodiment 1600 of a data stream. A transport packet 1610 including a header with a program clock reference (PCR) time 1612 is transmitted periodically (for example, every 200 ms). The packetized elementary stream 1614 for a video frame packet includes a frame header with a presentation stamp time (PTS) 1616 and one or more slices 1618. Each slice 1618 contains two or more macro-blocks 1620. The PCR time defines the time of arrival of data at the decoder 1914 (FIG. 19). The PTS is in the time base of the PCR time, i.e., it is a time difference or delta. The PTS defines when decoding and presentation of a video frame in the decoder starts. Typically, the transport packet 1610 includes some 188 bytes and the packetized elementary stream 1614 includes some 10-200 kB.

Figure 17:
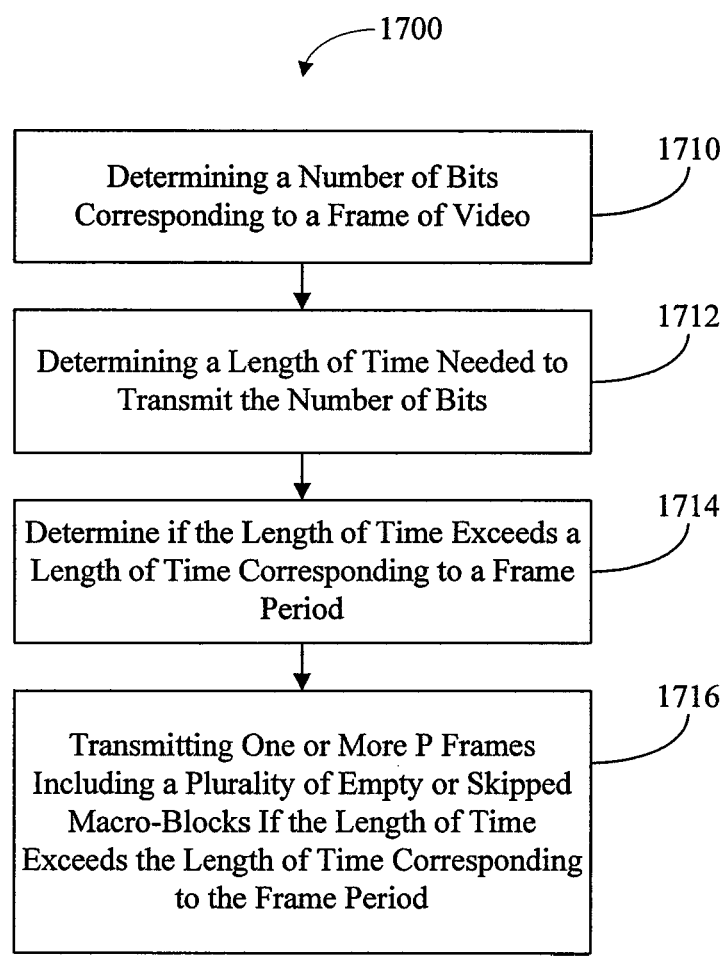
FIG. 17 is a flow diagram illustrating an embodiment of a process of generating a data stream corresponding to at least a frame of video.

FIG. 17 is a flow diagram illustrating an embodiment of a process 1700 of generating a data stream corresponding to at least a frame of video. A number of bits corresponding to a frame of video is determined (1710). A length of time (the transmit time) needed to transmit the number of bits is determined (1712). It is also determined whether the transmit time exceeds the length of time corresponding to a frame period (1714). One or more P frames including a plurality of empty or skipped macro-blocks are transmitted if the transmit time exceeds the length of time corresponding to the frame period (1716). The process 1700 may include fewer operations or additional operations. In addition, two or more operations may be combined and/or the order of the operations may be changed.

Pre-Encoded Video and Audio

In some embodiments, one or more pre-encoded video sequences may be combined with a frame of video that includes synthesized video-game image information. For example, a video game may include an image of a television or other display device on which a video sequence is displayed. If the one or more pre-encoded video sequences are contained in one or more subsets of an image area corresponding to the video-game image information, i.e., the frame of video corresponds to the video-game image information and includes a region with a pre-encoded video sequence, such a combination may be less problematic. The synthesized video-game image information may be excluded from one or more rectangular regions where the video sequences take place. However, if the video-game information is contained in one or more subsets of the image area corresponding to a pre-encoded video sequence, i.e., the frame of video corresponds to the pre-encoded video sequence and includes a region with the video-game image information, the combination may be more challenging. In this case, the pre-encoded video sequence may be encoded using a compatible approach to that used to encode the video-game image information. Thus, the pre-encoded video sequence may be encoded such that it has the same GOP, and thus the same data stream format, as the video-game information. This may allow one or more subsets in frames of video in the video sequence to be excluded from use as a motion source in motion estimation computations. The two data streams may, therefore, be merged in the encoding domain while preventing the video-game image information from corrupting the pre-encoded video sequence. A resulting data stream for a respective frame of video will have a combination of macro-blocks, including those for the video sequence and those for the video-game image information. The pre-encoded video-game macro-blocks may have a broader range of AC coefficients and quantization values than the video-game image information (which may be substantially the same for multiple frames of video). In addition, motion vectors inside the one or more regions with pre-encoded video sequences may not refer to regions with the video-game image information (and vice versa).

One or more frames of video in the respective video game may also include audio information. The audio information may be generated using pre-compressed blocks. Each pre-compressed audio block may correspond to respective frame of video, i.e., they may be generated on a frame basis. In an exemplary embodiment, a Dolby audio encoding format, such as Dolby Audio Coding-3 (AC3), may be used.

In some embodiments, a transient sound effect may be implemented by temporarily replacing background sound. Background sound, such as music, may be present during a plurality of frames of video over an extended time period. Transient sound effects may be present during one or more frames of video, but over a smaller time interval than the background sound. To smooth a transition from the transient sound effect back to the background sound, the background sound may be attenuated and the volume slowly increased over several frames of video during the transition.

In some embodiments, however, the background sound and the transient sound effect may be mixed together (i.e., both may be present substantially currently). One way to implement such mixing would be to decode pre-encoded audio blocks, perform the mixing and then recode the audio blocks. In an alternate embodiment, a modified AC3 encoding format may be used. Existing AC3 encoding interrelates and intermixes audio corresponding to five point one surround-sound channels (front left, front right, front center, back left, back right and low frequency effects). In the alternate embodiment, a first subset of the channels including one or more of the surround-sound channels may correspond to the background sound and a second subset of the channels including one or more of the surround-sound channels may correspond to the transient sound effect. The first and the second subsets of the channels may be encoded separately. This may facilitate blending or mixing of pre-encoded blocks corresponding to the background sound and the transient sound effect on the fly, i.e., without decoding, mixing and then re-encoding.

Hardware and Data Structures

Figure 18:
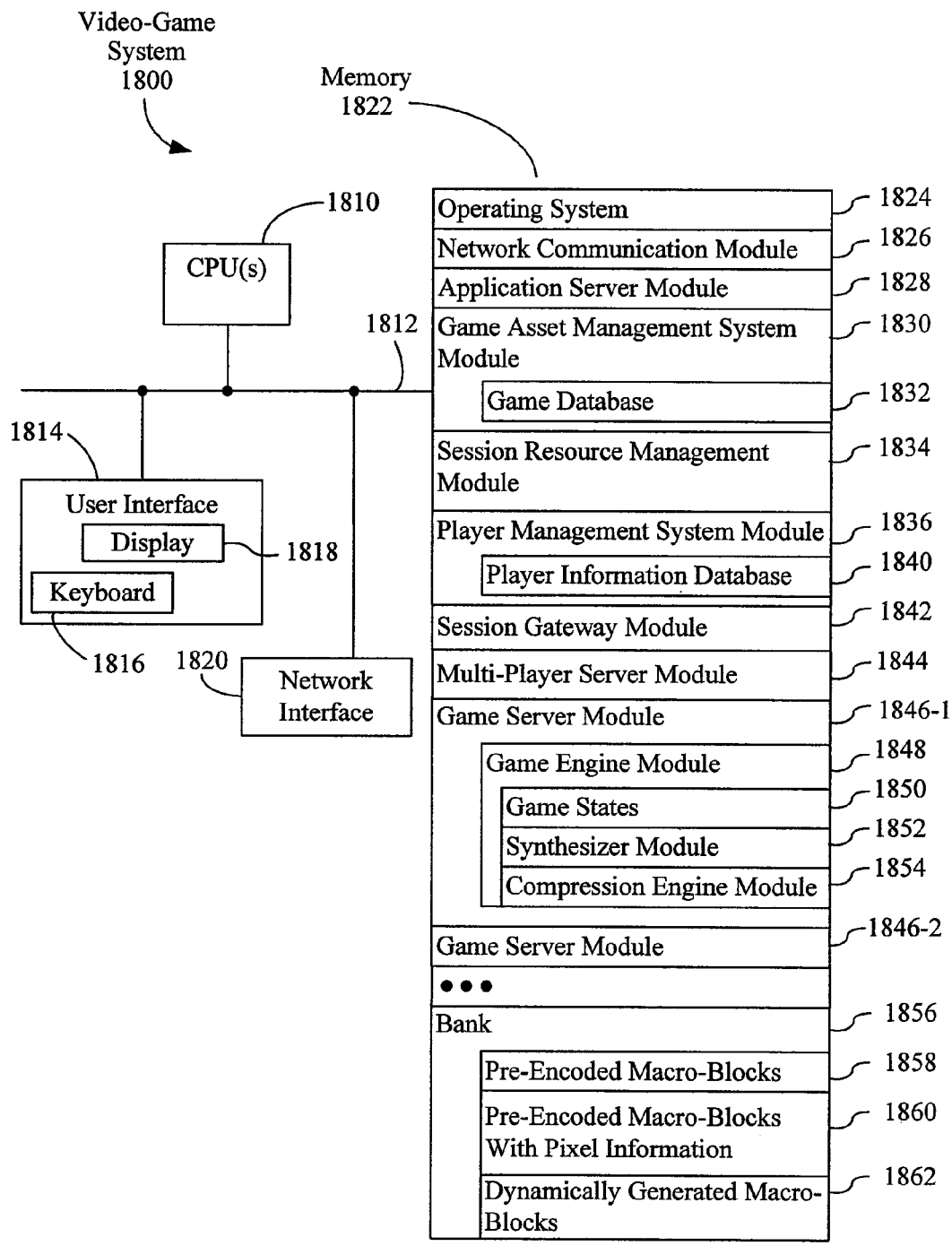
FIG. 18 is a block diagram illustrating an embodiment of a video-game system.

Attention is now directed towards several embodiments of hardware for generating one of more frames of video corresponding to one or more video games using pre-encoded macro-blocks. FIG. 18 is a block diagram illustrating an embodiment of a video-game system 1800. The video-game system 1800 may include at least one data processor, video processor and/or central processing unit (CPU) 1810, one or more optional user interfaces 1814, a communications or network interface 1820 for communicating with other computers, servers and/or one or more STBs (such as the STB 140 in FIG. 1), memory 1822 and one or more signal lines 1812 for coupling these components to one another. At least the one data processor, video processor and/or central processing unit (CPU) 1810 may be configured or configurable for multi-threaded or parallel processing. The user interface 1814 may have one or more keyboards 1816 and/or displays 1818. The one or more signal lines 1812 may constitute one or more communications busses.

Memory 1822 may include high-speed random access memory and/or non-volatile memory, including ROM, RAM, EPROM, EEPROM, one or more flash disc drives, one or more optical disc drives and/or one or more magnetic disk storage devices. Memory 1822 may store an operating system 1824, such as LINUX, UNIX or WINDOWS, that includes procedures (or a set of instructions) for handling basic system services and for performing hardware dependent tasks. Memory 1822 may also store communication procedures (or a set of instructions) in a network communication module 1826. The communication procedures are used for communicating with one or more users using STBs, such as the STB 140 (FIG. 1), and with other servers and computers in the video-game system 1800.

Memory 1822 may also include the following elements, or a subset or superset of such elements, including an applications server module 1828 (or a set of instructions), a game asset management system module 1830 (or a set of instructions), a session resource management module 1834 (or a set of instructions), a player management system module 1836 (or a set of instructions), a session gateway module 1842 (or a set of instructions), a multi-player server module 1844 (or a set of instructions), one or more game server modules 1846 (or sets of instructions), and a bank 1856 for storing macro-blocks. The game asset management system module 1830 may include a game database 1832, including pre-encoded blocks and executable code corresponding to one or more video games. The player management system module 1836 may include a player information database 1840 including information such as user's name, account information, transaction information, preferences for customizing display of video games on the STB 140 (FIG. 1), high scores for the video games played, rankings and other skill level information for video games played, and/or a persistent saved game state for video games that have been paused and may resume later. Each instance of the game server module 1846 may include one or more game engine modules 1848, synthesizer module 1852 and one or more compression engine modules 1854. The game engine modules 1848 may also include games states 1850 corresponding to one or more sets of users playing one or more video games. The bank 1856 may include pre-encoded macro-blocks 1858 corresponding to one or more video games, pre-encoded macro-blocks with pixel information 1860 corresponding to one or more video games, and/or dynamically generated or encoded macro-blocks 1862 corresponding to one or more video games.

The game server modules 1846 may run a browser application, such as Windows Explorer, Netscape Navigator or Mozilla from FireFox, to execute instructions corresponding to a respective video game. The browser application, however, may be configured to not render the video-game content in the game server modules 1846. Rendering the video-game content may be unnecessary, since the content is not displayed by the game servers, and avoiding such rendering enables each game server to maintain many more game states than would otherwise be possible. The game server modules 1846 may have one or multiple processors. Video games may be executed in parallel by multiple processors. Games may also be implemented in a multi-threaded operating system.

Although FIG. 18 shows the video-game system 1800 as a number of discrete items, FIG. 18 is intended more as a functional description of the various features which may be present in a video-game system rather than as a structural schematic of the embodiments described herein. In practice, and as recognized by those of ordinary skill in the art, the functions of the video-game system 1800 may be distributed over a large number of servers or computers, with various groups of the servers performing particular subsets of those functions. Items shown separately in FIG. 18 could be combined and some items could be separated. For example, some items shown separately in FIG. 18 could be implemented on single servers and single items could be implemented by one or more servers. The actual number of servers in a video-game system and how features, such as the game server modules 1846 and the game engine modules 1848, are allocated among them will vary from one implementation to another, and may depend in part on the amount of information stored by the system and/or the amount data traffic that the system must handle during peak usage periods as well as during average usage periods.

FIG. 19 is a block diagram illustrating an embodiment of a set top box (STB) 1900, such as the STB 140 (FIG. 1). The STB 1900 transmits order information and information corresponding to user actions, and receives video-game content using the network 136. Received signals are processed using network interface 1910 to remove headers and other information in the data stream containing the video-game content. The resulting signals are processed in tuner 1912, to select frequencies corresponding to one or more sub-channels, and in decoder 1914. In an exemplary embodiment, the decoder 1914 is an MPEG2 decoder. In other embodiments, the decoder 1914 may be an MPEG-compatible decoder or a decoder for another video-compression standard. The video-game content output from the decoder 1914 is converted to an appropriate format for driving display 1922 using display driver 1916. User commands or actions input to the game controller 1924 are received by device interface 1918 and forwarded to the network interface 1910 for transmission. The STB 1900 may optionally include a user interface 1920, such as a keyboard, buttons, and/or a liquid crystal or other display.

The game controller 1924 may be a dedicated video-game console, such as those provided by Sony Playstation®, Nintendo®, Sega® and Microsoft Xbox® or a personal computer. The game controller 1924 may receive information corresponding to one or more user actions from a game pad, keyboard, joystick, microphone, mouse, one or more remote controls, one or more additional game controllers or other user interface such as one including voice recognition technology. The display 1922 may be a cathode ray tube or a liquid crystal display in a television, a computer or a portable device, such as a video game controller 1924 or a cellular telephone.

The STB 1900 may have an embedded operating system such as Linux, OS9 or Windows, or a real-time operating system (e.g., VxWorks™ by Wind River Systems, Inc.) suitable for use on industrial or commercial devices.

In some embodiments, the STB 1900 may perform a smoothing operation on the received video-game content prior to displaying the video-game content. In some embodiments, received video-game content is decoded and displayed on the display 1922 in real time as it is received. In other embodiments, the STB 1900 stores the received video-game content until a full frame of video is received. The full frame of video is then decoded and displayed on the display 1922.

Figure 20:
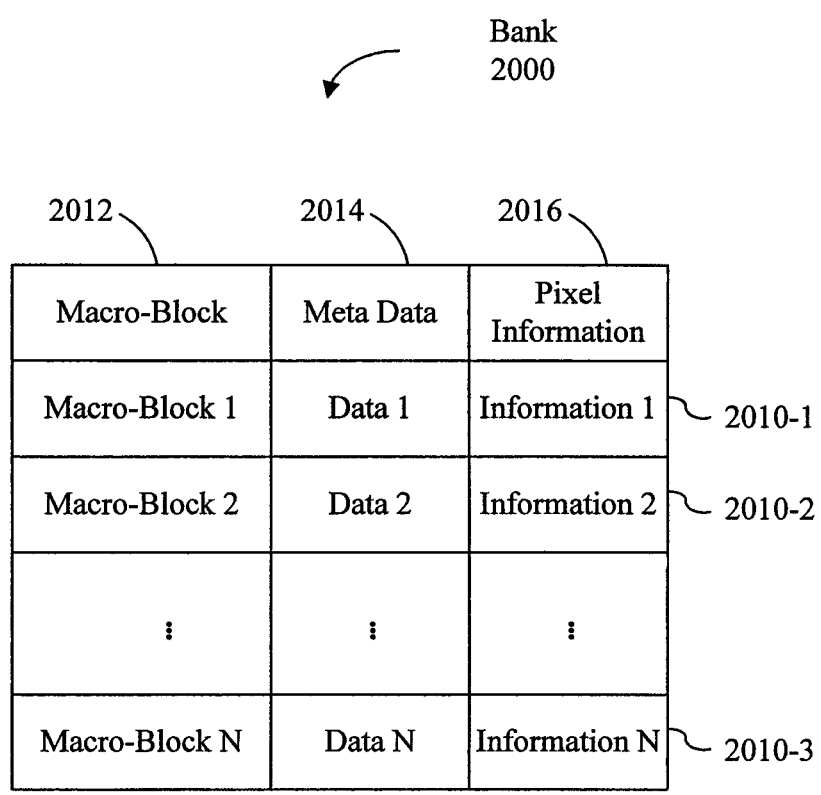
FIG. 20 is a block diagram illustrating an embodiment of a data structure in a bank of pre-encoded macro-blocks.

Attention is now directed towards an embodiment of a data structure, such as one of the banks 610 (FIG. 6), for pre-encoded macro-blocks. FIG. 20 is a block diagram illustrating an embodiment of a data structure in a bank 2000 of pre-encoded macro-blocks. The bank 2000 includes multiple entries 2010 for pre-encoded macro-blocks 2012 (the compressed ac coefficients of the intra and predicted blocks and the dc coefficient deltas of the second, third and forth luminance block of an intra macro-block), meta data 2014, and optional un-compressed pixel information 2016. The meta data 2014 may include the quantization factor, one or more DC coefficients and/or information corresponding to up to four other macro-blocks to which the macro-block may be compared (for pre-encoded animation sequences that utilize motion estimation, including one or more motion vectors and/or correction values).

The system and method described may be implement in hardware and/or software. Instructions may be implement in a high-level procedural language, an object-oriented programming language or in an assembly or machine language. The programming language may be compiled or interpreted. In addition, general purpose and special purpose micro-processors, as well as application specific integrated circuits may be utilized.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
at a video game system comprising one or more video game servers:
storing pre-encoded macro-blocks in a bank of individually addressable pre-encoded macro-blocks; and
for each of two or more video games:
receiving a request to initiate the video game;
receiving a command corresponding to a user action in the video game;
in response to the command, generating a frame of video using a plurality of the pre-encoded macro-blocks, the generating comprising:
dynamically generating macro-blocks in accordance with the user action, or a prior user action, in the video game; and
storing respective pointers to respective entries in a grid distinct from the bank, the respective pointers referencing the dynamically-generated macro-blocks and respective pre-encoded macro-blocks in the bank, the respective entries corresponding to respective locations in the frame of video, wherein the grid comprises a 2-dimensional array of entries having multiple rows of entries, a respective row of entries in the grid corresponding to a slice of the frame of video; and
transmitting a data stream corresponding to the frame of video to a user device for display;
wherein the frame of video is compatible with an MPEG compression standard, the pre-encoded macro-blocks are pre-encoded and stored in the bank prior to receiving the requests to initiate the two or more video games, and respective pre-encoded macro-blocks in the bank are shared between the two or more video games.

2. The method of claim 1, wherein each entry in the grid is assigned a corresponding macro-block of the frame of video when generating the frame of video, and wherein generating the frame of video comprises storing, in at least a plurality of entries in the grid, pointers referencing pre-encoded macro-blocks in the bank.

3. The method of claim 1, wherein a respective pre-encoded macro-block includes meta data, and wherein the meta data includes a quantization factor.

4. The method of claim 1, wherein a subset of the plurality of the pre-encoded macro-blocks include un-compressed pixel information.

5. The method of claim 4, further comprising dynamically generating a plurality of macro-blocks, wherein the plurality of dynamically-generated macro-blocks include a combination of the subset of the plurality of the pre-encoded macro-blocks that include un-compressed pixel information and image information corresponding to an object.

6. The method of claim 5, wherein the combination includes blending at least a portion of the subset of the plurality of the pre-encoded macro-blocks that includes un-compressed pixel information and the image information corresponding to the object.

7. The method of claim 5, wherein the combination includes superposition of the image information corresponding to the object on a region of the frame of video corresponding to at least a portion of the subset of the plurality of the pre-encoded macro-blocks that include un-compressed pixel information.

8. The method of claim 5, wherein generating the frame of video further comprises storing, in at least a plurality of entries in the grid for a respective video game of the two or more video games, pointers referencing the plurality of dynamically-generated macro-blocks, generated after initiation of the respective video game.

9. An apparatus, comprising:
at least one processor; and
a memory storing one or more programs configured to be executed by the at least one processor, the one or more programs comprising:
instructions for storing pre-encoded macro-blocks in a bank of individually addressable pre-encoded macro-blocks; and
for each of two or more video games:
instructions for receiving a request to initiate the video game;
instructions for receiving a command corresponding to a user action in the video game;
instructions for generating, in response to the command, a frame of video using a plurality of pre-encoded macro-blocks, the generating comprising dynamically generating macro-blocks in accordance with the user action, or a prior user action, in the video game, and storing respective pointers to respective entries in a grid distinct from the bank, the respective pointers referencing the dynamically-generated macro-blocks and respective pre-encoded macro-blocks in the bank, the respective entries corresponding to respective locations in the frame of video, wherein the grid comprises a 2-dimensional array of entries having multiple rows of entries, a respective row of entries in the grid corresponding to a slice of the frame of video; and instructions for transmitting the frame of video to a user device for display;

wherein the frame of video is compatible with an MPEG compression standard, the pre-encoded macro-blocks are pre-encoded and stored in the bank prior to receiving the requests to initiate the two or more video games, and respective pre-encoded macro-blocks in the bank are shared between the two or more video games.

10. The apparatus of claim 9, wherein each entry in the grid is assigned a corresponding macro-block of the frame of video when generating the frame of video, and wherein the instructions for generating the frame of video comprise instructions for storing, in at least a plurality of entries in the grid, pointers referencing pre-encoded macro-blocks in the bank.

11. The apparatus of claim 9, wherein a respective pre-encoded macro-block includes meta data, and wherein the meta data includes a quantization factor.

12. The apparatus of claim 9, wherein a subset of the plurality of the pre-encoded macro-blocks include un-compressed pixel information.

13. The apparatus of claim 12, the one or more programs further include instructions for dynamically generating a plurality of macro-blocks, wherein the plurality of dynamically-generated macro-blocks include a combination of the subset of the plurality of the pre-encoded macro-blocks that include un-compressed pixel information and image information corresponding to an object.

14. The apparatus of claim 13, wherein the instructions for dynamically generating a plurality of macro-blocks include instructions for blending at least a portion of the subset of the plurality of the pre-encoded macro-blocks that includes un-compressed pixel information and the image information corresponding to the object.

15. The apparatus of claim 13, wherein the combination includes superposition of the image information corresponding to the object on a region of the frame of video corresponding to at least a portion of the subset of the plurality of the pre-encoded macro-blocks that include un-compressed pixel information.

16. The apparatus of claim 13, wherein the instructions for generating the frame of video further comprise instructions for storing, in at least a plurality of entries in the grid for a respective video game of the two or more video games, pointers referencing a plurality of dynamically-generated macro-blocks, generated after initiation of the respective video game.

17. A non-transitory computer readable storage medium storing one or more programs configured for execution by a computer, the one or more programs comprising instructions to:

store pre-encoded macro-blocks in a bank of individually addressable pre-encoded macro-blocks; and for each of two or more video games:
 receive a request to initiate the video game;
 receive a command corresponding to a user action in the video game;
 generate, in response to the command, a frame of video using a plurality of pre-encoded macro-blocks, wherein generating the frame of video comprises dynamically generating macro-blocks in accordance with the user action, or a prior user action, in the video game, and assigning respective pointers to respective entries in a grid distinct from the bank, the respective pointers referencing the dynamically-generated macro-blocks and respective pre-encoded macro-blocks in the bank, the respective entries corresponding to respective locations in the frame of video, wherein the grid comprises a 2-dimensional array of entries having multiple rows of entries, each row of entries in the grid corresponding to a slice of the frame of video; and transmit the frame of video to a user device for display;

wherein the frame of video is compatible with an MPEG compression standard, the pre-encoded macro-blocks are pre-encoded and stored in the bank prior to receiving the requests to initiate the two or more video games, and respective pre-encoded macro-blocks in the bank are shared between the two or more video games.

18. The non-transitory computer readable storage medium of claim 17, wherein each entry in the grid is assigned a corresponding macro-block of the frame of video when generating the frame of video, and wherein the instructions for generating the frame of video comprise instructions for storing, in at least a plurality of entries in the grid, pointers referencing pre-encoded macro-blocks in the bank.

19. The non-transitory computer readable storage medium of claim 17, wherein a respective pre-encoded macro-block includes meta data, and wherein the meta data includes a quantization factor.

20. The non-transitory computer readable storage medium of claim 17, wherein a subset of the plurality of the pre-encoded macro-blocks include un-compressed pixel information.

21. The non-transitory computer readable storage medium of claim 20, the one or more programs further include instructions for dynamically generating a plurality of macro-blocks, wherein the plurality of dynamically-generated macro-blocks include a combination of the subset of the plurality of the pre-encoded macro-blocks that include un-compressed pixel information and image information corresponding to an object.

22. The non-transitory computer readable storage medium of claim 21, wherein the instructions for dynamically generating a plurality of macro-blocks include instructions for blending at least a portion of the subset of the plurality of the pre-encoded macro-blocks that includes un-compressed pixel information and the image information corresponding to the object.

23. The non-transitory computer readable storage medium of claim 21, wherein the combination includes superposition of the image information corresponding to the object on a region of the frame of video corresponding to at least a portion of the subset of the plurality of the pre-encoded macro-blocks that include un-compressed pixel information.

24. The non-transitory computer readable storage medium of claim 21, wherein the instructions for generating the frame of video further comprise instructions for storing, in at least a plurality of entries in the grid for a respective video game of the two or more video games, pointers referencing a plurality of dynamically-generated macro-blocks, generated after initiation of the respective video game.

* * * * *